US012212013B2

(12) United States Patent
Xu

(10) Patent No.: US 12,212,013 B2
(45) Date of Patent: Jan. 28, 2025

(54) BATTERY, ELECTRIC APPARATUS, AND METHOD AND APPARATUS FOR MANUFACTURING BATTERY

(71) Applicant: CONTEMPORARY AMPEREX TECHNOLOGY (HONG KONG) LIMITED, Hong Kong (CN)

(72) Inventor: Hu Xu, Fujian (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 0 days.

(21) Appl. No.: 18/609,001

(22) Filed: Mar. 19, 2024

(65) Prior Publication Data

US 2024/0222766 A1    Jul. 4, 2024

Related U.S. Application Data

(63) Continuation of application No. PCT/CN2021/132873, filed on Nov. 24, 2021.

(30) Foreign Application Priority Data

Oct. 12, 2021   (CN) .......................... 202111188271.0

(51) Int. Cl.
*H01M 10/04*      (2006.01)
*B60L 50/60*      (2019.01)
(Continued)

(52) U.S. Cl.
CPC ..... *H01M 50/209* (2021.01); *H01M 10/0404* (2013.01); *H01M 10/0431* (2013.01);
(Continued)

(58) Field of Classification Search
CPC ............ H01M 50/209; H01M 10/613; H01M 10/6555; H01M 10/6567; H01M 50/289;
(Continued)

(56) References Cited

U.S. PATENT DOCUMENTS 6,569,561 B1 * 5/2003 Kimura ............... H01M 10/647
429/153
2012/0062180 A1   3/2012 Nakamura et al.
(Continued)

FOREIGN PATENT DOCUMENTS

CN   102403550 A   4/2012
CN   205319257 U   6/2016
(Continued)

OTHER PUBLICATIONS

Machine translation of JP2008-198453 (Year: 2024).*
(Continued)

*Primary Examiner* — Lingwen R Zeng
(74) *Attorney, Agent, or Firm* — XSENSUS LLP

(57) ABSTRACT

A battery may include a box; and at least two groups of battery cells accommodated in the box, where each group of battery cells may include a plurality of battery cells arranged along a first direction, the first direction being parallel to an upper cover or a bottom wall of the box, and the at least two groups of battery cells may be stacked along a second direction, the second direction being perpendicular to the first direction. The battery cell may be a polyhedral structure and include a first wall and a second wall that may be connected to each other, where the first wall may be parallel to the first direction, the second wall may be oblique to the first wall, and a cross section of the battery cell on a plane perpendicular to the first wall and the second wall may be a parallelogram.

19 Claims, 12 Drawing Sheets

(51) Int. Cl.
| | |
|---|---|
| H01M 10/613 | (2014.01) |
| H01M 10/647 | (2014.01) |
| H01M 10/653 | (2014.01) |
| H01M 10/6555 | (2014.01) |
| H01M 10/6557 | (2014.01) |
| H01M 10/6567 | (2014.01) |
| H01M 50/103 | (2021.01) |
| H01M 50/176 | (2021.01) |
| H01M 50/209 | (2021.01) |
| H01M 50/242 | (2021.01) |
| H01M 50/249 | (2021.01) |
| H01M 50/267 | (2021.01) |
| H01M 50/289 | (2021.01) |
| H01M 50/291 | (2021.01) |
| H01M 50/342 | (2021.01) |
| H01M 50/547 | (2021.01) |
| H01M 50/548 | (2021.01) |
| H01M 50/55 | (2021.01) |
| B60L 50/64 | (2019.01) |

(52) U.S. Cl.
CPC ....... H01M 10/613 (2015.04); H01M 10/647 (2015.04); H01M 10/653 (2015.04); H01M 10/6555 (2015.04); H01M 10/6557 (2015.04); H01M 10/6567 (2015.04); H01M 50/103 (2021.01); H01M 50/176 (2021.01); H01M 50/242 (2021.01); H01M 50/249 (2021.01); H01M 50/267 (2021.01); H01M 50/289 (2021.01); H01M 50/291 (2021.01); H01M 50/3425 (2021.01); H01M 50/547 (2021.01); H01M 50/548 (2021.01); H01M 50/55 (2021.01); B60L 50/60 (2019.02); B60L 50/64 (2019.02); B60L 50/66 (2019.02); H01M 2220/20 (2013.01); Y02E 60/10 (2013.01); Y02P 70/50 (2015.11)

(58) Field of Classification Search
CPC ............. H01M 10/0431; H01M 10/04; H01M 10/0404; H01M 10/0525; H01M 10/058; H01M 10/0583; H01M 10/647; H01M 10/653; H01M 10/6557; H01M 2220/20; H01M 50/103; H01M 50/176; H01M 50/202; H01M 50/207; H01M 50/242; H01M 50/249; H01M 50/267; H01M 50/291; H01M 50/3425; H01M 50/547; H01M 50/548; H01M 50/55; B60L 50/60; B60L 50/64; B60L 50/66; Y02E 60/10; Y02P 70/50

See application file for complete search history.

(56) References Cited

U.S. PATENT DOCUMENTS

| | | | |
|---|---|---|---|
| 2021/0218104 | A1 | 7/2021 | Cho et al. |
| 2022/0209341 | A1* | 6/2022 | Liu ................... H01M 50/553 |

FOREIGN PATENT DOCUMENTS

| | | |
|---|---|---|
| CN | 209447876 U | 9/2019 |
| CN | 112909398 A | 6/2021 |
| CN | 213782184 U | 7/2021 |
| EP | 2418709 A1 | 2/2012 |
| JP | 2008-198453 A | 8/2008 |
| JP | 2010-135148 A | 6/2010 |
| JP | 2019067763 A | 4/2019 |
| WO | 2021/003680 A1 | 1/2021 |

OTHER PUBLICATIONS

International Search Report and Written Opinion mailed on Jul. 18, 2022, received for PCT Application PCT/CN2021/132873, filed on Nov. 24, 2021, 11 pages including English Translation.
Office Action issued Jun. 18, 2024 in Chinese Patent Application No. 202111188271.0 with English translation.

* cited by examiner

BATTERY, ELECTRIC APPARATUS, AND METHOD AND APPARATUS FOR MANUFACTURING BATTERY

CROSS-REFERENCE TO RELATED APPLICATIONS

This application is a continuation of International Application No. PCT/CN2021/132873, filed Nov. 24, 2021, which claims priority to Chinese patent application Ser. No. 202111188271.0, filed with the China National Intellectual Property Administration on Oct. 12, 2021 and entitled "BATTERY CELL, BATTERY, AND ELECTRIC APPARATUS", each of which is incorporated herein by reference in its entirety.

TECHNICAL FIELD

Embodiments of this application relate to the field of batteries, and more specifically, to a battery, an electric apparatus, and a method and apparatus for manufacturing battery.

BACKGROUND

Energy conservation and emission reduction are crucial to sustainable development of the automobile industry. Electric vehicles, with their advantages in energy conservation and environmental protection, have become an important part of sustainable development of the automobile industry. For electric vehicles, battery technology is an important factor in connection with environmental protection.

A battery can be installed in an electric apparatus, for example, an electric vehicle. Movement of the electric vehicle may cause an impact to the battery. If the battery has low stiffness and strength, such impact causes an adverse effect on performance of the battery, and even leads to safety problems. Therefore, how stiffness and strength of batteries are enhanced is an urgent technical problem that needs to be solved in the battery technology.

SUMMARY

This application provides a battery, an electric apparatus, and a method and apparatus for manufacturing battery, so as to enhance stiffness and strength of the battery.

According to a first aspect, a battery is provided and includes a box; and at least two groups of battery cells accommodated in the box, where each of the at least two groups of battery cells includes a plurality of battery cells arranged along a first direction, the first direction being parallel to an upper cover or a bottom wall of the box, and the at least two groups of battery cells are stacked along a second direction, the second direction being perpendicular to the first direction; and the battery cell is a polyhedral structure and includes a first wall and a second wall that are connected to each other, where the first wall is parallel to the first direction, the second wall is oblique to the first wall, and a cross section of the battery cell on a plane perpendicular to the first wall and the second wall is a parallelogram; where second walls of a first battery cell and a second battery cell that are adjacent to each other along the first direction are attached to each other; and a connecting line of the centers of gravity of a third battery cell and a fourth battery cell that are adjacent to each other along the second direction is parallel to the second direction.

In the solution provided in this application, the battery cells with a cross section being a parallelogram are stacked along the first direction, such that the battery cells can be attached to each other via oblique walls, which is conducive to increasing a contact area of two adjacent battery cells, and thus helps increase an amount of an adhesive for bonding the two adjacent battery cells, so as to enhance assembly stability of the battery cells. In addition, gravity of the battery cell can act on the oblique walls that are attached to each other, so that a first component force perpendicular to the oblique walls and a second component force parallel to the oblique walls can be present between the two adjacent battery cells that are attached to each other via the oblique walls. Under the action of the first component force, the two adjacent battery cells can squeeze each other, so as to help improve stacking compactness of each group of battery cells in the first direction. Under the action of the second component force, resistance for preventing the two adjacent battery cells from moving relative to each other can be provided, so as to help improve stacking stability of each group of battery cells.

In addition, the at least two groups of battery cells are arranged along the second direction that is perpendicular to the first direction, so that the centers of gravity of the two adjacent battery cells along the second direction can be on a same straight line, helping avoid reduction of arrangement stability of the at least two groups of battery cells in the box due to deviation of the center of gravity. Further, electrode terminals of the plurality of battery cells can be disposed on a same straight line, facilitating conductive connection of the at least two groups of battery cells. Moreover, a distance from the battery cell to a side wall of the box can be shortened, so that the at least two groups of battery cells in the box can be arranged more compactly, helping increase overall energy density of the battery.

In a possible implementation, the center of gravity of the third battery cell has a same distance to a side wall of the box as the center of gravity of the fourth battery cell. Because the centers of gravity of the two adjacent battery cells along the second direction have a same distance to the side wall of the box, both spaces formed by the oblique walls of the two battery cells and the side wall are small, such that the at least two groups of battery cells can occupy much accommodating space of the box, helping increase the overall energy density of the battery.

In a possible implementation, the battery cell further includes a third wall, where the third wall is parallel to the first wall, a first wall of the third battery cell is aligned with a first wall of the fourth battery cell, and a third wall of the third battery cell is aligned with a third wall of the fourth battery cell. The first walls of the two adjacent battery cells along the second direction may be opposite to each other, the third walls of the two adjacent battery cells along the second direction may be opposite to each other, and the first wall is parallel to the third wall. Therefore, the two walls of the third battery cell can be aligned with the two walls of the fourth battery cell in the second direction, facilitating position calibration of the battery cell in the box during installation and dismantlement of the battery cell.

In a possible implementation, the first wall of the third battery cell and the first wall of the fourth battery cell face toward each other, or the first wall of the third battery cell and the third wall of the fourth battery cell face toward each other. When the first wall of the third battery cell and the first wall of the fourth battery cell face toward each other, an oblique wall of the third battery cell is oblique to an oblique wall of the fourth battery cell; and when the first wall of the third battery cell and the third wall of the fourth battery cell face toward each other, an oblique wall of the third battery cell is parallel to an oblique wall of the fourth battery cell, thereby helping improve flexibility of the at least two groups of battery cells in an arrangement direction.

In a possible implementation, the battery cell further includes a first electrode terminal and a second electrode terminal, where the first electrode terminal and the second electrode terminal are located on two sides of the battery cell, respectively. The battery cell with a cross section being a parallelogram may have two electrode terminals which are located on two sides of the battery cell, respectively.

In a possible implementation, the battery cell further includes a fourth wall and a fifth wall that are opposite to each other, where the fourth wall is connected to the first wall and the second wall, the fifth wall is connected to the first wall and the second wall, the fourth wall is provided with the first electrode terminal, and the fifth wall is provided with the second electrode terminal. The electrode terminal may be disposed on a wall not configured for attachment, thereby helping reduce possibility of damage of the electrode terminal caused by external forces such as an attachment force.

In a possible implementation, the fourth wall is perpendicular to the first wall and the second wall. The fourth wall is perpendicular to the first wall and the second wall, which is conducive to reducing space between the fourth wall and the side wall of the box, such that the at least two groups of battery cells can occupy more accommodating space of the box, helping increase the overall energy density of the battery.

In a possible implementation, the first wall is a wall with the largest area in the battery cell. The wall with the largest area is parallel to the bottom wall or the upper cover of the box, so that the battery cell can be disposed flat in the box.

In a possible implementation, the battery cell further includes a first electrode terminal and a second electrode terminal, where the first electrode terminal and the second electrode terminal are located on a same side of the battery cell. The battery cell with a cross section being a parallelogram may have two electrode terminals which are separately located on a same side of the battery cell.

In a possible implementation, the first electrode terminal and the second electrode terminal are disposed on the first wall. The two electrode terminals of the battery cell are parallel to the bottom wall or the upper cover of the box, so that the electrode terminals can be conductively connected via the bottom wall or the upper cover.

When the battery cell is disposed upright in the box, the second wall can be a wall with the largest area in the battery cell, and gravity of the battery cell can be used to counteract a swelling force of the battery cell, helping reduce a force from the battery cell on the side wall or an end plate of the box.

In a possible implementation, the battery cell includes a first electrode assembly and a second electrode assembly, where the first electrode assembly and the second electrode assembly are arranged along the first direction. In this way, the first electrode assembly and the second electrode assembly can have a same infiltration height in an electrolyte of the battery cell. A plurality of electrode assemblies may be arranged along the bottom wall or the upper cover of the box in the battery cell, such that the electrolyte in the battery cell can immerse and infiltrate the plurality of electrode assemblies to a substantially same extent, helping improve environmental consistency of the plurality of electrode assemblies in the battery cell.

In a possible implementation, the first wall is connected to the second wall via a rounded corner. A plurality of walls of the battery cell are connected via rounded corners, which is conducive to reducing difficulty of forming a housing of the battery cell and reducing stress concentration at joints of the plurality of walls, thereby helping improve mechanical stability and service life of the housing of the battery cell.

In a possible implementation, a spacer is disposed between the third battery cell and the fourth battery cell, and the spacer is at least one of the following: a cross beam, a thermal management component, and a structural adhesive. One or more spacers may further be disposed between the at least two groups of battery cells, so as to optimize overall performance of the battery via the spacers.

In a possible implementation, the battery cell includes an electrode assembly, and the electrode assembly is any one of the following: a cylindrical wound structure, a long cylindrical wound structure, and a laminated structure. The battery cell with a cross section being a parallelogram may be applied to various types of electrode assemblies and thus has high flexibility.

In a possible implementation, the battery includes N groups of such battery cells, and each group of such battery cells includes M battery cells, where N and M are positive integers greater than 1 and N is less than M. A quantity of the battery cells in each group of battery cells may be greater than a total quantity of groups of the at least two groups of battery cells. In another possible implementation, a quantity of the battery cells in each group of battery cells may be less than or equal to a total quantity of groups of the at least two groups of battery cells.

In a possible implementation, an inclination angle $\theta$ of the second wall to the second direction satisfies $0°<\theta\leq60°$. The inclination angle of the second wall is reasonably designed, which is conducive to adjusting a stacking structure and an arrangement structure of the battery cells in the box and adjusting a force between two adjacent battery cells that are stacked along the first direction.

In a possible implementation, a first size T of the battery cell in the first direction satisfies 6 mm$\leq$T$\leq$150 mm. The first size of the battery cell is reasonably designed, which is conducive to adjusting the stacking structure and the arrangement structure of the battery cells in the box and adjusting the force between the two adjacent battery cells that are stacked along the first direction.

In a possible implementation, a second size H of the battery cell in the second direction satisfies $H=(T-c)*\cot\theta$, where $-50$ mm$\leq c\leq 50$ mm, T is the first size of the battery cell in the first direction, and $\theta$ is the inclination angle of the second wall to the second direction. The second size of the battery cell is reasonably designed, which is conducive to adjusting the stacking structure and the arrangement structure of the battery cells in the box and adjusting the force between the two adjacent battery cells that are stacked along the first direction.

In a possible implementation, a third size W of the battery cell satisfies 100 mm$\leq$W$\leq$1200 mm. The third size of the battery cell is reasonably designed, which is conducive to adjusting the stacking structure and the arrangement structure of the battery cells in the box and adjusting the force between the two adjacent battery cells that are stacked along the first direction.

According to a second aspect, an electric apparatus is provided and includes the battery according to the first aspect or any possible implementation of the first aspect.

According to a third aspect, a method for manufacturing battery is provided and includes: providing a box; providing at least two groups of battery cells, where the at least two groups of battery cells are accommodated in the box, each of the at least two groups of battery cells includes a plurality of battery cells arranged along a first direction, the first direction being parallel to an upper cover or a bottom wall of the box, and the at least two groups of battery cells are stacked along a second direction, the second direction being perpendicular to the first direction; and the battery cell is a polyhedral structure and includes a first wall and a second wall that are connected to each other, where the first wall is parallel to the first direction, the second wall is oblique to the first wall, and a cross section of the battery cell on a plane perpendicular to the first wall and the second wall is a parallelogram; where second walls of a first battery cell and a second battery cell that are adjacent to each other along the first direction are attached to each other; and a connecting line of the centers of gravity of a third battery cell and a fourth battery cell that are adjacent to each other along the second direction is parallel to the second direction; and accommodating the at least two groups of battery cells in the box.

According to a fourth aspect, an apparatus for manufacturing battery is provided and includes a providing module configured to: provide a box; and provide at least two groups of battery cells, where the at least two groups of battery cells are accommodated in the box, each of the at least two groups of battery cells includes a plurality of battery cells arranged along a first direction, the first direction being parallel to an upper cover or a bottom wall of the box, and the at least two groups of battery cells are stacked along a second direction, the second direction being perpendicular to the first direction; and the battery cell is a polyhedral structure and includes a first wall and a second wall that are connected to each other, where the first wall is parallel to the first direction, the second wall is oblique to the first wall, and a cross section of the battery cell on a plane perpendicular to the first wall and the second wall is a parallelogram; where second walls of a first battery cell and a second battery cell that are adjacent to each other along the first direction are attached to each other; and a connecting line of the centers of gravity of a third battery cell and a fourth battery cell that are adjacent to each other along the second direction is parallel to the second direction; and an installation module configured to accommodate the at least two groups of battery cells in the box.

In the battery, the electric apparatus, and the method and apparatus for manufacturing battery provided in this application, the cross section of the battery cell perpendicular to the first wall and the second wall is a parallelogram, the first wall is parallel to the upper cover or the bottom wall of the box and is oblique to the second wall, and each group of battery cells are stacked along the upper cover or the bottom wall of the box and attached to each other via the second walls. Therefore, the two adjacent battery cells can be attached to each other via the oblique walls, which is conducive to increasing the contact area of the two adjacent battery cells, and thus helps increase the amount of the adhesive for bonding the two adjacent battery cells, so as to enhance the assembly stability of the battery cells. In addition, gravity of the battery cell can act on the second walls that are attached to each other, so that the first component force perpendicular to the second wall and the second component force parallel to the second wall can be present between the two adjacent battery cells that are attached to each other via the second walls. Under the action of the first component force, the two adjacent battery cells can squeeze each other, so as to help improve the stacking compactness of each group of battery cells in the first direction. Under the action of the second component force, the resistance for preventing the two adjacent battery cells from moving relative to each other can be provided, so as to help improve the stacking stability of each group of battery cells. In addition, the at least two groups of battery cells are arranged along the direction that is perpendicular to the upper cover or the bottom wall of the box, so that the centers of gravity of the two adjacent battery cells along the second direction can be on a same straight line, helping avoid reduction of the arrangement stability of the at least two groups of battery cells in the box due to deviation of the center of gravity. Further, the electrode terminals of the plurality of battery cells can be disposed on a same straight line, thereby facilitating conductive connection of the at least two groups of battery cells. Moreover, the distance from the battery cell to the side wall of the box can be shortened, so that the at least two groups of battery cells in the box can be arranged more compactly, helping increase the overall energy density of the battery.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following descriptions show merely some embodiments of this application, and persons of ordinary skill in the art may still derive other drawings from the accompanying drawings without creative efforts.

Figure 1:
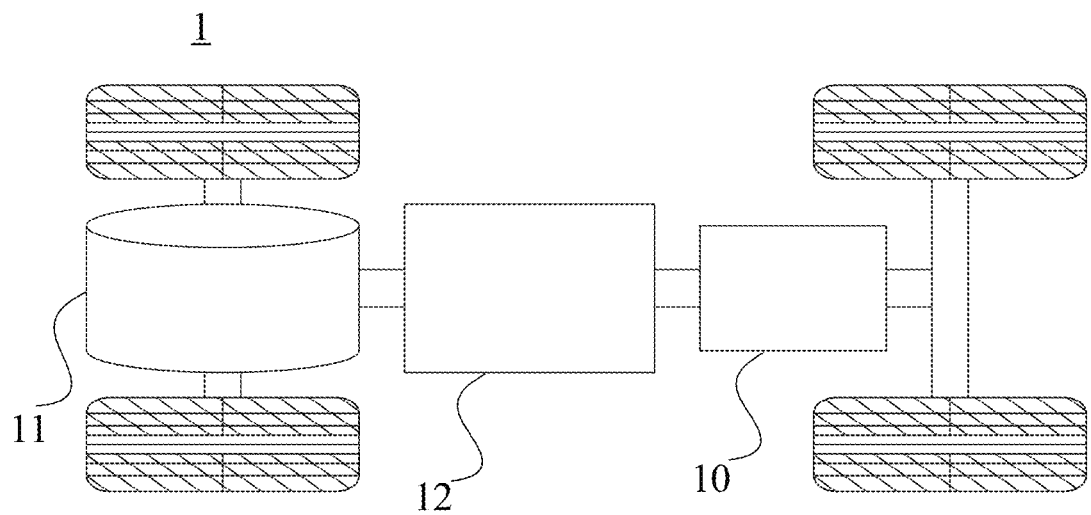
FIG. 1 is a schematic structural diagram of a vehicle according to an embodiment of this application.

In the accompanying drawings, the figures are not drawn to scale.

DESCRIPTION OF EMBODIMENTS

The following further describes the implementations of this application in detail with reference to the accompanying drawings and embodiments. The detailed description of embodiments and the accompanying drawings are intended to illustrate the principle of this application, rather than to limit the scope of this application, meaning this application is not limited to the embodiments described herein.

In the descriptions of this application, it should be noted that, unless otherwise stated, "a plurality of" means more than two; and the orientations or positional relationships indicated by the terms "upper", "lower", "left", "right", "inside", "outside", and the like are merely for ease and brevity of description of this application rather than indicating or implying that the apparatuses or elements mentioned must have specific orientations or must be constructed or manipulated according to specific orientations, and therefore shall not be construed as any limitation on this application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The orientation terms appearing in the following description all refer to directions shown in the figures, and do not limit the specific structure in this application. In the description of this application, it should also be noted that unless otherwise specified and defined explicitly, the terms "install", "connect", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

The term "and/or" in this application is only an associative relationship for describing associated objects, indicating that three relationships may be present. For example, A and/or B may indicate the following three cases: presence of only A, presence of both A and B, and presence of only B. In addition, the character "/" in this application generally indicates an "or" relationship between associated objects.

Unless otherwise defined, all technical and scientific terms used in this application shall have the same meanings as commonly understood by persons skilled in the art to which this application belongs. The terms used in the specification of this application are intended to merely describe the specific embodiments rather than to limit this application. The terms "include", "have", and any variations thereof in the specification, claims, and brief description of drawings of this application are intended to cover non-exclusive inclusions. In the specification, claims, or accompanying drawings of this application, the terms "first", "second", and the like are intended to distinguish between different objects rather than to describe a specific order or a primary-secondary relationship.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments. Persons skilled in the art explicitly and implicitly understand that the embodiments described in this application can be combined with other embodiments.

In this application, a battery is a physical module that includes one or more battery cells to supply electric energy.

For example, the battery mentioned in this application may include a battery module, a battery pack, or the like. A battery generally includes a box for packaging one or more battery cells. The box can prevent liquids or other foreign matter from affecting charging or discharging of the battery cell.

Optionally, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. In some implementations, the battery cell may also be referred to as a cell.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. The part of the current collector uncoated with the positive electrode active substance layer protrudes out of the part of the current collector coated with the positive electrode active substance layer and serves as a positive tab. A lithium-ion battery is used as an example, for which, the positive electrode current collector may be made of aluminum, and the positive electrode active substance may be lithium cobalt oxide, lithium iron phosphate, ternary lithium, lithium manganate oxide, or the like. The negative electrode plate includes a negative electrode current collector and a negative electrode active substance layer. The negative electrode active substance layer is applied on a surface of the negative electrode current collector. The part of the current collector uncoated with the negative electrode active substance layer protrudes out of the part of the current collector coated with the negative electrode active substance layer and serves as a negative tab. The negative electrode current collector may be made of copper, and the negative electrode active substance may be carbon, silicon, or the like. To allow a high current to pass through without any fusing, a plurality of positive tabs are provided and stacked together, and a plurality of negative tabs are provided and stacked together. The separator may be made of polypropylene (Polypropylene, PP), polyethylene (Polyethylene, PE), or the like. In addition, the electrode assembly may be a winding structure or a laminated structure, but the embodiments of this application are not limited thereto.

For the development of battery technologies, many design factors need to be considered, for example, performance parameters such as energy density, cycle life, discharge capacity, and charge and discharge rate, as well as installation stability of batteries in electric apparatuses, so as to improve safety of the batteries in the electric apparatuses.

In some battery packaging technologies, a plurality of battery cells (cell) are integrated into a battery module (module) first, and then the battery modules are installed in a box of the battery to form a battery pack (pack). In some other battery packaging technologies, a plurality of battery cells may alternatively be directly installed in a box to form a battery pack, with an intermediate state of battery module removed, which can reduce mass of the battery pack and increase energy density of the battery. The second packaging technology may also be referred to as a cell-to-pack (cell to pack) packaging technology in the related art, and the battery pack may be referred to as battery for short in this application.

In view of this, this application provides a technical solution in which the battery cell is designed as a battery cell of a polyhedral structure different from a conventional prismatic battery cell. The battery cell of a polyhedral structure includes a first wall and a second wall that are connected to each other, where the first wall is parallel to the first direction, the second wall is oblique to the first wall, and a cross section of the battery cell on a plane perpendicular to the first wall and the second wall is a parallelogram. A plurality of battery cells can be stacked into groups, and each group of battery cells includes a plurality of battery cells arranged along a first direction, where the first direction is parallel to an upper cover or a bottom wall of the box. At least two groups of battery cells are stacked along a second direction, where the second direction is perpendicular to the first direction. Second walls of a first battery cell and a second battery cell that are adjacent to each other along the first direction are attached to each other; and a connecting line of the centers of gravity of a third battery cell and a fourth battery cell that are adjacent to each other along the second direction is parallel to the second direction.

Large surfaces and small surfaces of the conventional prismatic battery cell may be fixedly connected to each other via a structural adhesive, so that the whole battery has specified strength and stiffness to prevent impact of external forces. However, in this case, a coating area of the structural adhesive between the battery cells is limited and no interaction force is present between the battery cells, which affects installation stability of the battery cells in the box and limits overall strength and stiffness of the battery after packaging, bringing certain safety hazards.

In the solution provided in this embodiment of this application, each battery cell in each group of battery cells has at least one second wall being pressed by an oblique second wall of an adjacent battery cell, so that each battery cell can be constrained by the adjacent battery cell. Gravity of the battery cell can act on the oblique walls that are attached to each other, so that a first component force perpendicular to the oblique wall and a second component force parallel to the oblique wall can be present between the two adjacent battery cells that are attached to each other via the oblique walls. Under the action of the first component force, the two adjacent battery cells can squeeze each other, so as to help improve stacking compactness of each group of battery cells in the first direction. Under the action of the second component force, resistance for preventing the two adjacent battery cells from moving relative to each other can be provided, so as to help improve stacking stability of each group of battery cells. The force between the battery cells makes them restrict each other, which can enhance the overall stiffness and strength of the battery, reducing safety risks caused by vibration impact during use of the battery.

The technical solution described in this embodiment of this application is applicable to various apparatuses that use batteries, for example, mobile phones, portable devices, notebook computers, electric bicycles, electric toys, electric tools, electric vehicles, ships, and spacecrafts. For example, the spacecrafts include airplanes, rockets, space shuttles, spaceships, and the like.

It should be understood that the technical solution described in this embodiment of this application is not limited to the apparatuses described above, and can be applicable to all apparatuses that use batteries, but for the sake of concise description, in the following embodiments, the electric vehicle is used as an example.

For example, FIG. 1 is a schematic structural diagram of a vehicle 1 according to an embodiment of this application. The vehicle 1 may be a fossil fuel vehicle, a natural gas vehicle, or a new energy vehicle. The new energy vehicle may be a battery electric vehicle, a hybrid electric vehicle, a range-extended electric vehicle, or the like. A motor 11, a controller 12, and a battery 10 may be disposed inside the vehicle 1, where the controller 12 is configured to control the battery 10 to supply power to the motor 11. For example, the battery 10 may be disposed at the bottom, front, or rear of the vehicle 1. The battery 10 can be configured to supply power to the vehicle 1. For example, the battery 10 can be used as an operational power source for the vehicle 1 which is configured for a circuit system of the vehicle 1, for example, to satisfy power needs of start, navigation, and running of the vehicle 1. In another embodiment of this application, the battery 10 can be used not only as the operational power source for the vehicle 1, but also as a driving power source for the vehicle 1, replacing or partially replacing fossil fuel or natural gas to provide driving traction for the vehicle 1.

To meet different power usage requirements, the battery may include a plurality of battery cells, and the plurality of battery cells may be connected in series, parallel, or series-parallel, where being connected in series-parallel means a combination of series and parallel connections. The battery may also be referred to as a battery pack. Optionally, in terms of electrical connection, the plurality of battery cells may be connected in series, parallel, or series-parallel to form a battery module first, and then a plurality of battery modules are connected in series, parallel, or series-parallel to form a battery. In other words, the plurality of battery cells may be directly combined into a battery, or may first combined into battery modules which are then combined into a battery.

Figure 2:
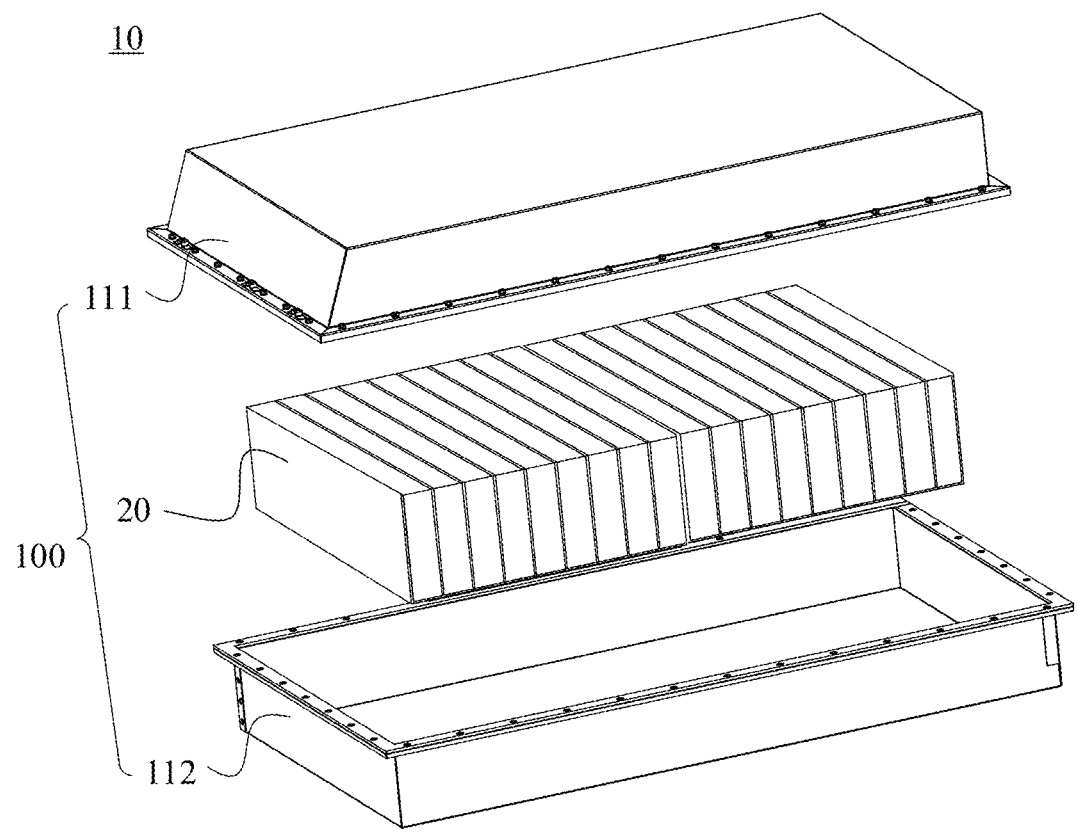
FIG. 2 is a schematic structural diagram of a battery according to an embodiment of this application.

For example, FIG. 2 is a schematic structural diagram of a battery 10 according to an embodiment of this application. The battery 10 may include a plurality of battery cells 20. The battery 10 may further include a box 100 (or referred to as a cover body), the inside of the box 100 is a hollow structure, and the plurality of battery cells 20 are accommodated in the box 100. As shown in FIG. 2, the box 100 may include two portions which are herein referred to as a first portion 111 and a second portion 112, respectively. The first part 111 and the second part 112 are snap-fitted together. Shapes of the first portion 111 and the second portion 112 may be determined according to a combination shape of the plurality of battery cells 20. Both the first portion 111 and the second portion 112 may have an opening. For example, the first portion 111 and the second portion 112 each may be a hollow cuboid with only one surface having an opening, the opening of the first portion 111 is disposed opposite the opening of the second portion 112, and the first portion 111 and the second portion 112 are snap-fitted to form a box 100 with an enclosed chamber. The plurality of battery cells 20 are connected in parallel, series, or series-parallel and then placed into the box 100 formed by snap-fitting the first portion 111 and the second portion 112.

Optionally, in an implementation, the plurality of battery cells (cell) 20 may be integrated into at least one battery module (module) first, and then the battery modules are installed in the box 100 of the battery 10 to form a battery pack (pack). In this implementation, an auxiliary structural member such as a cross beam may be disposed between the battery modules, which can improve installation stability of the battery modules in the box 100.

Optionally, in a second implementation, the plurality of battery cells 20 may alternatively be directly connected to each other and installed in the box 100 to form a battery pack, without an intermediate state of battery module, and it is unnecessary to provide an auxiliary structural member such as a cross beam in the box 100, thereby reducing mass of the battery 10 and increasing energy density of the battery 10. This implementation may also be referred to as a cell-to-pack (cell to pack, CTP) installation technology in the related art.

Optionally, in a third implementation, the box 100 may be integrated into an electric apparatus in which the battery 10 is located. In other words, the box 100 and structural members in the electric apparatus may be integrally formed. The plurality of battery cells 20 may be directly installed in the box 100 in the electric apparatus after being connected to each other. In an example, the box 100 may be integrated into a partial region of a chassis of the vehicle 1, and the plurality of battery cells 20 may be directly installed on the chassis of the vehicle 1 after being connected to each other. This implementation may also be referred to as a cell-to-chassis (cell to chassis, CTC) installation technology in the related art.

Optionally, the battery 10 may further include other structures. Details are not described herein again. For example, the battery 10 may further include a busbar that is used to implement electrical connection between the plurality of battery cells 20, for example, in a parallel, series, or series-parallel manner. Specifically, the busbar may implement the electrical connection between the battery cells 20 by connecting electrode terminals of the battery cells 20. Further, the busbar may be fixed to the electrode terminals of the battery cells 20 by welding. Electric energy of the plurality of battery cells 20 may be further led out by a conductive mechanism that passes through the box 100. Optionally, the conductive mechanism may also belong to the busbar.

According to different power requirements, a quantity of the battery cells 20 may be set to any numerical value. The plurality of battery cells 20 may be connected in series, parallel, or series-parallel to achieve large capacity or power.

Figure 3:
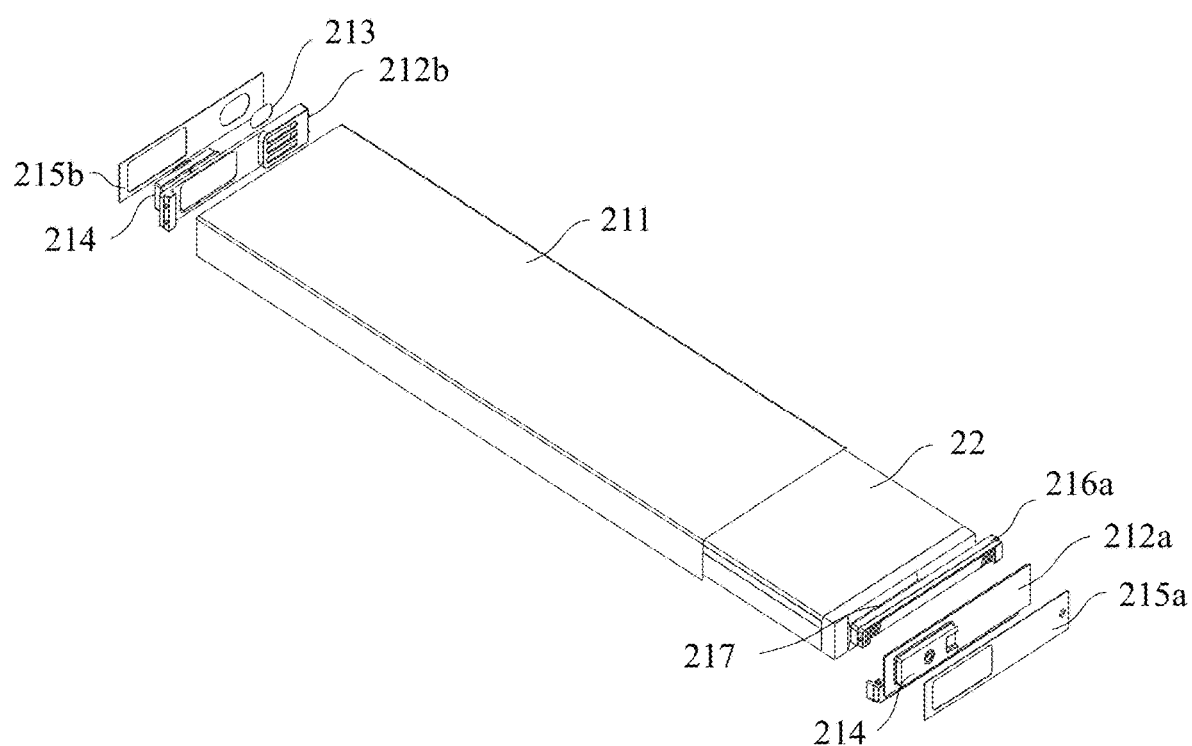
FIG. 3 is a schematic structural diagram of a battery cell according to an embodiment of this application.

FIG. 3 is a schematic structural diagram of a battery cell 20 according to an embodiment of this application. The battery cell 20 includes one or more electrode assemblies 22, a housing 211, a first cover plate 212*a*, and a second cover plate 212*b*. The first cover plate 212*a*, the second cover plate 212*b*, and walls of the housing 211 all are referred to as walls of the battery cell 20. The housing 211 is determined according to a combination shape of the one or more electrode assemblies 22. In an example, the housing 211 shown in FIG. 3 may be a hollow cuboid. At least one surface of the housing 211 has an opening so that the one or more electrode assemblies 22 can be placed into the housing 211. For example, in the embodiment shown in FIG. 3, two opposite surfaces of the housing 211 each have an opening, and the first cover plate 212*a* and the second cover plate 212*b* cover the openings on the two surfaces respectively and are connected to the housing 211 to form an enclosed cavity for accommodating the electrode assemblies 22. The housing 211 is filled with an electrolyte, for example, a liquid electrolyte.

For ease of description, in the embodiments of this application, the walls of the battery cell 20 are classified into three types according to areas of the walls of the battery cell 20. In this application, a wall with the largest area of the battery cell 20 may be a large surface (or a large wall), a wall with the smallest area of the battery cell 20 may be a small surface (or a small wall), and a wall with a medium area of the battery cell 20 may be an end surface (or an end wall), where an area of the wall with a medium area of the battery cell 20 is between areas of the wall with the smallest area and the wall with the largest area of the battery cell 20. The battery cell 20 may have one or two or even more large surfaces. The battery cell 20 may have one or two or even more small surfaces. In an embodiment, as shown in FIG. 3, regions that can be wrapped by the housing 211 may correspond to the large surface and the end surface of the battery cell 20, and the first cover plate 212*a* and the second cover plate 212*b* may correspond to the small surface of the battery cell.

In an embodiment, the longest side of the large surface may correspond to a length direction of the battery cell 20, the shortest side of the large surface may correspond to a width direction of the battery cell 20, and the shortest side of the small surface may correspond to a thickness direction of the battery cell 20.

The battery cell 20 may further include two electrode terminals 214. Optionally, as shown in FIG. 3, the two electrode terminals 214 may be disposed on the first cover plate 212*a* and the second cover plate 212*b*, respectively. Alternatively, in some other embodiments, the two electrode terminals 214 may be disposed on a same cover plate, for example, both be disposed on the first cover plate 212*a* or the second cover plate 212*b*.

The first cover plate 212*a* and the second cover plate 212*b* are generally in a shape of a flat plate, and the two electrode terminals 214 may be fixed on flat surfaces of the first cover plate 212*a* and the second cover plate 212*b*, respectively. The two electrode terminals 214 are a positive electrode terminal and a negative electrode terminal, respectively. Each electrode terminal 214 is correspondingly provided with a connection member or a current collection member. The connection members are located between the first cover plate 212*a* and the electrode assembly 22 and between the second cover plate 212*b* and the electrode assembly 22 for electrically connecting the electrode assembly 22 and the electrode terminals 214.

Optionally, as shown in FIG. 3, the battery cell 20 may further include a first holder 216*a* and a second holder (not shown in the figure), where the first holder 216*a* is disposed between the electrode assembly 22 and the first cover plate 212*a* for fastening and connecting the first cover plate 212*a*. Correspondingly, the second holder is disposed between the electrode assembly 22 and the second cover plate 212*b* for fastening and connecting the second cover plate 212*b*. Optionally, the connection members for connecting the electrode assembly 22 and the electrode terminals 214 may be located in the first holder 216*a* and the second holder, respectively.

Alternatively, in the battery cell 20, each electrode assembly 22 has a first tab 217 and a second tab. The first tab 217 and the second tab have opposite polarities. For example, when the first tab 217 is a positive tab, the second tab is a negative tab. The first tab 217 of the one or more electrode assemblies 22 is connected to one electrode terminal via one connection member, and the second tab of the one or more electrode assemblies 22 is connected to the other electrode terminal via the other connection member. For example, as shown in FIG. 3, the electrode terminal 214 located on the first cover plate 212*a* may be connected to the first tab 217 via one connection member located in the first holder 216*a*. In addition, the other electrode terminal 214 located on the second cover plate 212b may be connected to the second tab via the other connection member located in the second holder.

In an example, a pressure relief mechanism 213 may further be disposed on a wall of the battery cell 20. The pressure relief mechanism 213 is configured to be actuated when internal pressure or temperature of the battery cell 20 reaches a threshold, so as to relieve the internal pressure or temperature.

Optionally, in another embodiment of this application, the pressure relief mechanism 213 and the electrode terminal 214 are disposed on a same wall of the battery cell 20. In an example, as shown in FIG. 3, both the electrode terminal 214 and the pressure relief mechanism 213 may be disposed on the second cover plate 212b of the battery cell 20.

The pressure relief mechanism 213 and the electrode terminal 214 being disposed on a same wall of the battery cell 20 can facilitate processing and mounting of the pressure relief mechanism 213 and the electrode terminal 214, helping improve production efficiency of the battery 10.

Certainly, in other embodiments of this application, the pressure relief mechanism 213 and the electrode terminal 214 may alternatively be disposed on different walls of the battery cell 20. For example, the two electrode terminals 214 in the battery 10 are disposed on the first cover plate 212a and the second cover plate 212b of the battery cell 20, respectively, and the pressure relief mechanism 213 is disposed on a wall other than the first cover plate 212a and the second cover plate 212b in the battery 10.

The pressure relief mechanism 213 may be a part of the wall on which it is located, or may be a separate structure from the wall on which it is located and be fixed to the wall on which it is located by, for example, welding. For example, in the embodiment shown in FIG. 3, when the pressure relief mechanism 213 is a part of the second cover plate 212b, the pressure relief mechanism 213 may be formed by providing an indentation on the second cover plate 212b, and thickness of the second cover plate 212b corresponding to the indentation is less than thickness of other regions of the pressure relief mechanism 213 other than the indentation. The weakest portion of the pressure relief mechanism 213 is at the indentation. When internal pressure of the housing 211 rises and reaches a threshold due to too much gas produced by the battery cell 20, or when internal temperature of the battery cell 20 rises and reaches a threshold due to heat produced by internal reactions of the battery cell 20, the pressure relief mechanism 213 may break at the indentation, causing the inside and the outside of the housing 211 to be communicated and the gas pressure and temperature to be discharged out through the breakage of the pressure relief mechanism 213, thereby preventing the battery cell 20 from exploding.

In addition, the pressure relief mechanism 213 may be various possible pressure relief mechanisms. This is not limited in the embodiments of this application. For example, the pressure relief mechanism 213 may be a temperature-sensitive pressure relief mechanism configured to melt when the internal temperature of the battery cell 20 provided with the pressure relief mechanism 213 reaches the threshold; and/or the pressure relief mechanism 213 may be a pressure-sensitive pressure relief mechanism configured to break when the internal pressure of the battery cell 20 provided with the pressure relief mechanism 213 reaches the threshold.

Optionally, as shown in FIG. 3, the battery cell 20 may further include a first protective layer 215a and a second protective layer 215b, where the first protective layer 215a and the second protective layer 215b cover the first cover plate 212a and the second cover plate 212b, respectively, so as to protect the members on the two cover plates. Optionally, when the first cover plate 212a and the second cover plate 212b are metal cover plates, the first protective layer 215a and the second protective layer 215b may be insulation layers for insulating the metal cover plates from the outside. In addition, it can be seen from FIG. 3 that the first protective layer 215a and the second protective layer 215b may have openings adapted to the electrode terminals 214 and the pressure relief mechanism 213, so that the electrode terminals 214 are connected to the busbar through the openings and the pressure relief mechanism 213 releases the internal pressure of the battery cell 20 through the opening.

Figure 4:
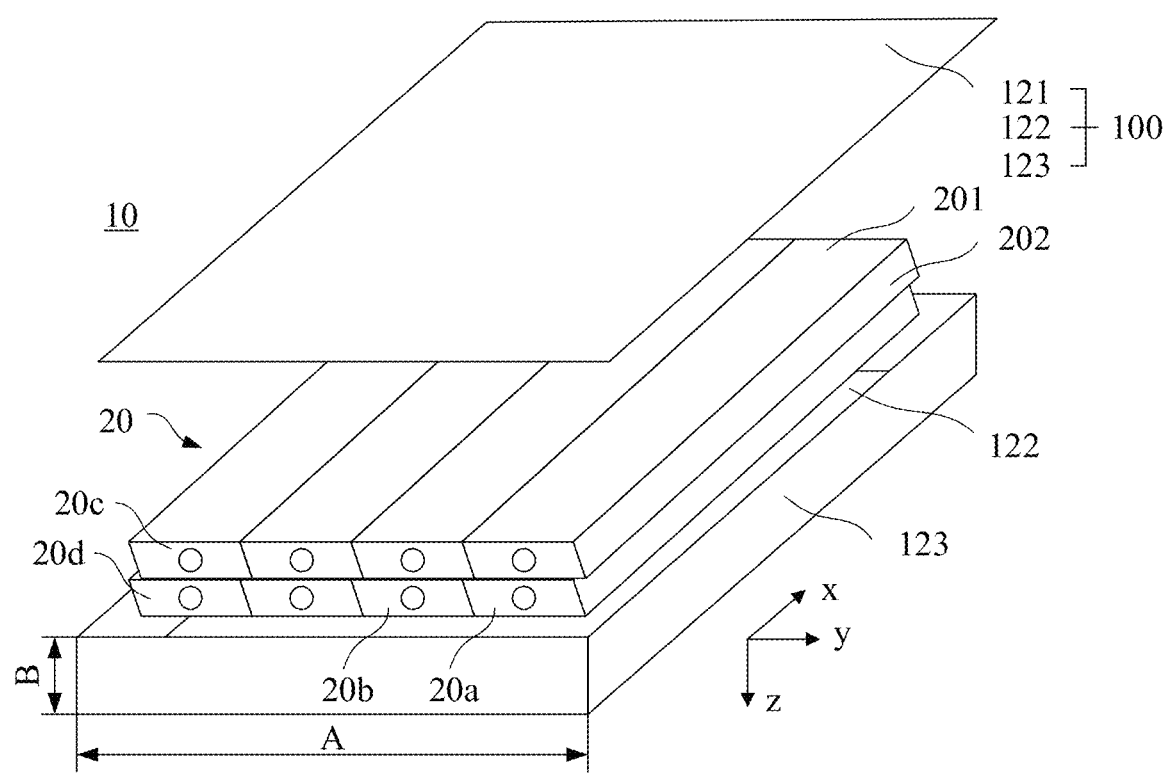
FIG. 4 is a schematic structural diagram of a battery according to an embodiment of this application.
Figure 5:
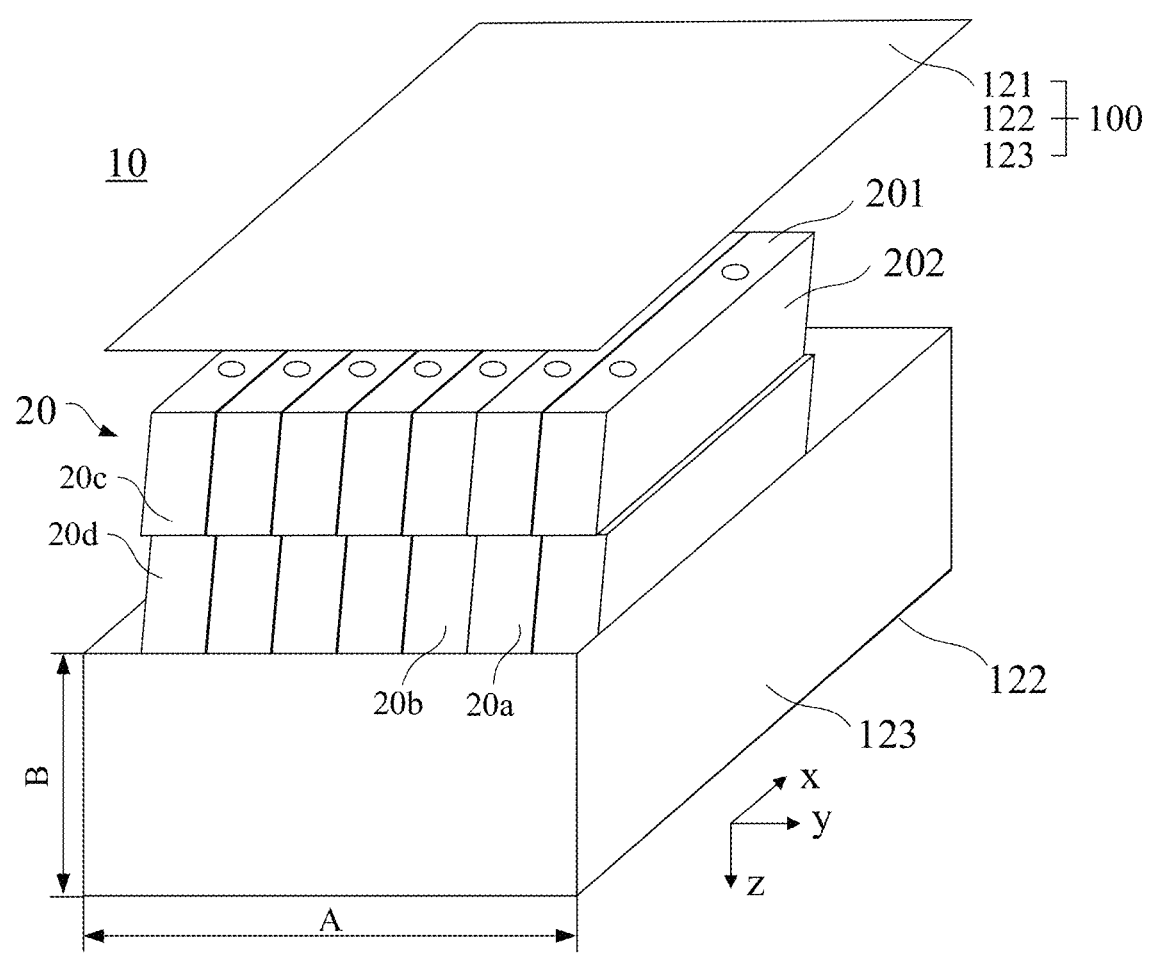
FIG. 5 is a schematic structural diagram of another battery according to an embodiment of this application.

FIG. 4 is a schematic structural diagram of a battery 10 according to an embodiment of this application. FIG. 5 is a schematic structural diagram of another battery 10 according to an embodiment of this application.

As shown in FIG. 4 and FIG. 5, the battery 10 may include a box 100; and at least two groups of battery cells 20 accommodated in the box 100, where each of the at least two groups of battery cells 20 includes a plurality of battery cells 20 arranged along a first direction y, the first direction y being parallel to an upper cover 121 or a bottom wall 122 of the box 100, and the at least two groups of battery cells 20 are stacked along a second direction z, the second direction z being perpendicular to the first direction y; and the battery cell 20 is a polyhedral structure and includes a first wall 201 and a second wall 202 that are connected to each other, where the first wall 201 is parallel to the first direction y, the second wall 202 is oblique to the first wall 201, and a cross section of the battery cell 20 on a plane perpendicular to the first wall 201 and the second wall 202 is a parallelogram; where second walls 202 of a first battery cell 20a and a second battery cell 20b that are adjacent to each other along the first direction y are attached to each other; and a connecting line of the centers of gravity of a third battery cell 20c and a fourth battery cell 20d that are adjacent to each other along the second direction z is parallel to the second direction z.

Optionally, in this embodiment of this application, the box 100 may be the box 100 in the embodiment shown in FIG. 2. To facilitate installation of the box 100 in an electric apparatus, as an example rather than a limitation, the box 100 may be a hollow hexahedral structure. In other possible embodiments, the box 100 may alternatively be a polyhedral structure having more or fewer surfaces, or another structure.

In the embodiments shown in FIG. 4 and FIG. 5, the box 100 may include the upper cover 121, a side wall 123, and the bottom wall 122. With reference to the embodiments shown in FIG. 2, FIG. 4, and FIG. 5, the upper cover 121 may be, for example, the first portion 111 shown in FIG. 2. The side wall 123 and the bottom wall 122 may be the second portion 112 shown in FIG. 2. As shown in FIG. 4 and FIG. 5, the upper cover 121 may be parallel to the bottom wall 122, and the side wall 123 may be connected between the upper cover 121 and the bottom wall 122 and be perpendicular to the upper cover 121 or the bottom wall 122. In an embodiment, the upper cover 121 and/or the bottom wall 122 may be mounted in the electric apparatus shown in FIG. 1 along a direction perpendicular to gravity, so as to stably fasten the battery.

To facilitate installation of the battery cells 20 in the box 100 and improve installation stability of the battery cells 20, the battery cell 20 may be a polyhedral structure. For example, the battery cell 20 may be a hexahedral structure and includes the first wall 201 and the second wall 202 that are connected to each other but not perpendicular to each other. In other implementations, the battery cell 20 may alternatively be another type of polyhedral structure, provided that the battery cell 20 includes the first wall 201 and the second wall 202 that are connected to each other but not perpendicular to each other. A specific shape of the battery cell 20 is not limited in the embodiments of this application. Optionally, in this embodiment of this application, for an internal structure of the battery cell 20, reference may be made to at least part of the related descriptions in the embodiment shown in FIG. 3.

Figure 6:
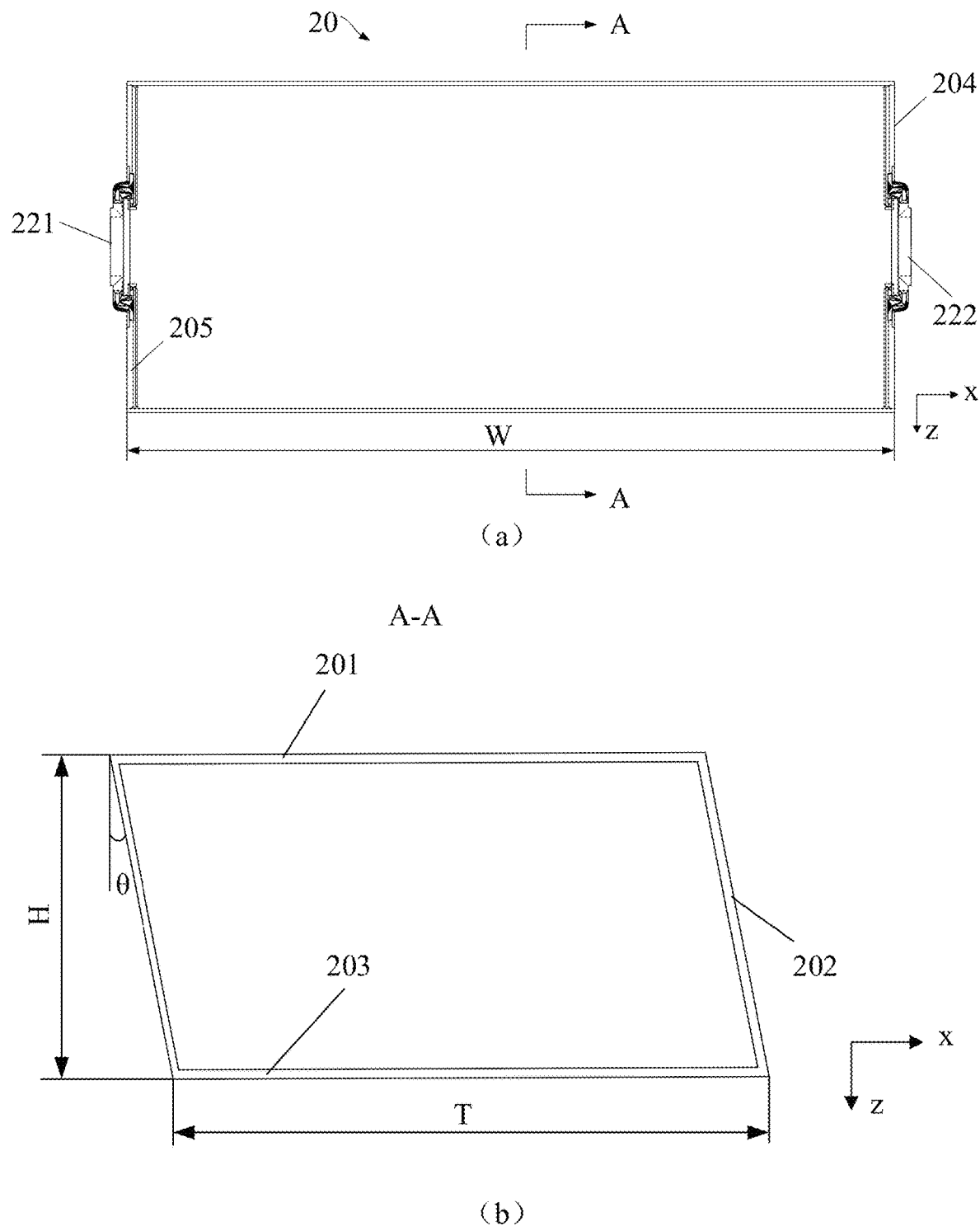
FIG. 6 is a schematic structural diagram of a battery cell according to an embodiment of this application.

FIG. 6 is a schematic structural diagram of a battery cell 20 according to an embodiment of this application. A cross-sectional view shown in (b) of FIG. 6 can be obtained by observing an A-A cross section shown in (a) of FIG. 6. The battery cell 20 shown in FIG. 6 may be the battery cell 20 shown in FIG. 4.

Figure 7:
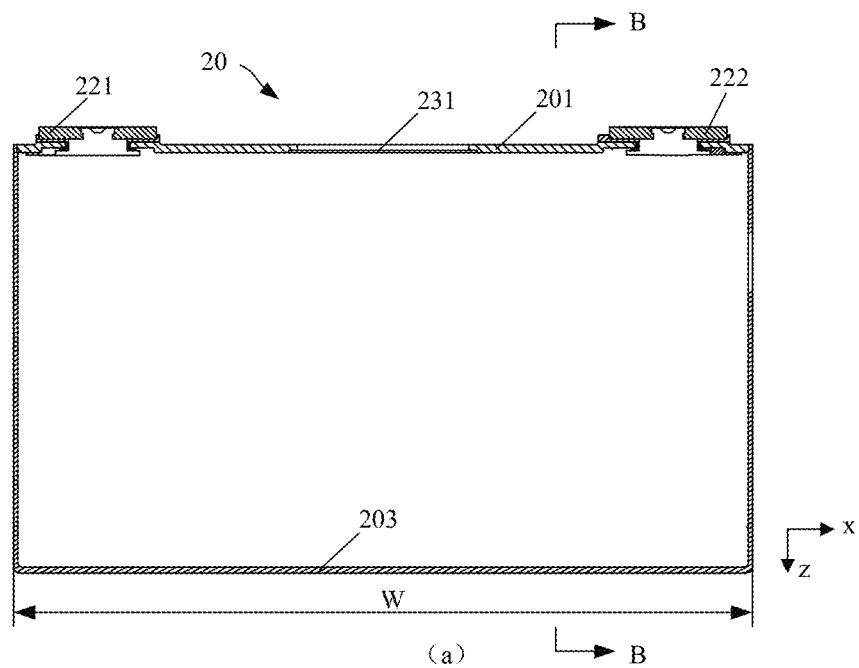
FIG. 7 is a schematic structural diagram of another battery cell according to an embodiment of this application.
Figure 7:
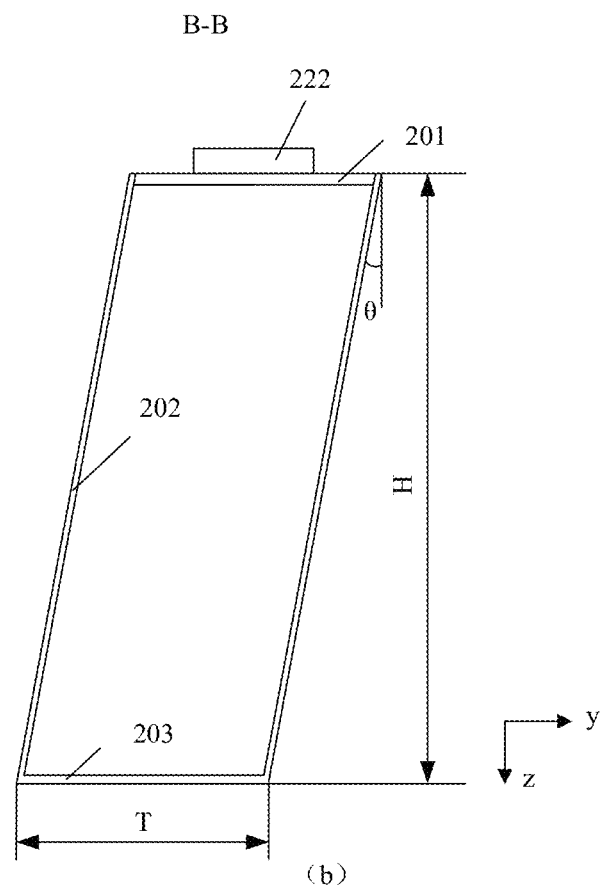

FIG. 7 is a schematic structural diagram of a battery cell 20 according to an embodiment of this application. A cross-sectional view shown in (b) of FIG. 7 can be obtained by observing a B-B cross section shown in (a) of FIG. 7. The battery cell 20 shown in FIG. 7 may be the battery cell 20 shown in FIG. 5.

As shown in FIG. 6 and FIG. 7, the first wall 201 and the second wall 202 of the battery cell 20 may be connected to each other to form a wedge-shaped structure, for example, a parallelogram structure. Specifically, an included angle between the first wall 201 and the second wall 202 may be an acute angle so as to form a parallelogram structure with an acute vertex angle. Alternatively, an included angle between the first wall 201 and the second wall 202 may be an obtuse angle so as to form a parallelogram structure with an obtuse vertex angle. Based on the technical solution in this embodiment of this application, the cross section of the battery cell 20 is a parallelogram, and the battery cell 20 has a regular and symmetrical structure, facilitating manufacturing and installation of the battery cell 20.

Optionally, the first wall 201 is connected to the second wall 202 via a rounded corner. In other words, the first wall 201 may be connected to the second wall 202 via an arc wall. Therefore, this is conducive to reducing difficulty of forming the housing of the battery cell 20 and reducing stress concentration at joints of the plurality of walls, helping prevent cracking between the first wall 201 and the second wall 202, thereby helping improve mechanical stability and service life of the housing of the battery cell 20.

As shown in FIG. 6 and FIG. 7, an included angle between the second wall 202 of the battery cell 20 and the second direction z may be represented by $\theta$. Optionally, as an example rather than a limitation, an inclination angle $\theta$ of the second wall 202 to the second direction z satisfies $0°<\theta\leq60°$. Further, the inclination angle $\theta$ of the second wall 202 to the second direction z satisfies $3°<\theta\leq10°$.

In the technical solution in this embodiment of this application, the included angle $\theta$ between the second wall 202 and the second direction z is adjusted, so that space occupied by the battery cell 20 and stability of the battery cell 20 can be balanced. In a case that the included angle $\theta$ is small, on the basis of ensuring the installation stability of the battery cell 20, transverse space occupied by the battery cell 20 can be reduced, increasing energy density of the battery 10.

Optionally, as an example rather than a limitation, a first size T of the battery cell 20 in the first direction y satisfies $6\ mm\leq T\leq150\ mm$. Further, the first size T of the battery cell 20 in the first direction y satisfies $12\ mm\leq T\leq80\ mm$.

Optionally, a second size H of the battery cell 20 in the second direction z satisfies $H=(T-c)*\cot\theta$, where $-50\ mm\leq c\leq50\ mm$, T is the first size of the battery cell 20 in the first direction y, and $\theta$ is the inclination angle of the second wall 202 to the second direction z. Further, the second size H of the battery cell 20 in the second direction z satisfies $H=(T-c)*\cot\theta$, where $-10\ mm\leq c\leq10\ mm$.

Optionally, as an example rather than a limitation, a third size W of the battery cell 20 satisfies $100\ mm\leq W\leq1200\ mm$. The third size W of the battery cell 20 may be length of the battery cell 20. Further, the third size W of the battery cell 20 satisfies $145\ mm\leq W\leq650\ mm$. Further, the third size W of the battery cell 20 satisfies $100\ mm\leq W\leq300\ mm$, $300\ mm\leq W\leq650\ mm$, or $650\ mm\leq W\leq1200\ mm$.

Optionally, the battery cell 20 further includes a first electrode terminal 221 and a second electrode terminal 222, where the first electrode terminal 221 and the second electrode terminal 222 are located on two sides of the battery cell 20, respectively, or the first electrode terminal 221 and the second electrode terminal 222 are located on a same side of the battery cell 20. The electrode terminals are disposed on a same side or different sides of the battery cell 20, so that the battery cell 20 can be flexibly applied to various electric environments. One of the first electrode terminal 221 and the second electrode terminal 222 may be a positive electrode terminal, and the other may be a negative electrode terminal.

In the embodiment shown in FIG. 6, the first electrode terminal 221 and the second electrode terminal 222 may be located on two sides of the battery cell 20, respectively.

Optionally, the battery cell 20 further includes a fourth wall 204 and a fifth wall 205 that are opposite to each other, where the fourth wall 204 is connected to the first wall 201 and the second wall 202, the fifth wall 205 is connected to the first wall 201 and the second wall 202, the fourth wall 204 is provided with the first electrode terminal 221, and the fifth wall 205 is provided with the second electrode terminal 222.

In the embodiment shown in FIG. 6, the fourth wall 204 and the fifth wall 205 may be two end portions of the battery cell 20 in a third direction x, and the third direction x may be, for example, the length direction. Further, the fourth wall 204 and the fifth wall 205 may be parallel to each other. According to the technical solution in this embodiment of this application, the first electrode terminal 221 and the second electrode terminal 222 are disposed on the two end portions of the battery cell 20 in the third direction x, respectively, which is conducive to reducing influence of the electrode terminals on attachment of the first wall 201 and the second wall 202 to other components, ensuring good stability of the battery cell 20.

In a possible embodiment, the fourth wall 204 or the fifth wall 205 may further be provided with a pressure relief mechanism. The pressure relief mechanism and the first electrode terminal 221 or the second electrode terminal 222 are disposed on a same side of the battery cell 20, which can facilitate manufacturing of the battery cell 20 and mounting of the pressure relief mechanism. For the description of the pressure relief mechanism, reference may be made to the pressure relief mechanism 213 in the embodiment shown in FIG. 3.

Optionally, the fourth wall 204 is perpendicular to the first wall 201 and the second wall 202. As shown in FIG. 6 and FIG. 7, a shape of the fourth wall 204 is the same as a shape of the cross section of the battery cell 20 on the plane perpendicular to the first wall 201 and the second wall 202, that is, the shape of the fourth wall 204 may be a parallelogram.

In other embodiments, the fourth wall 204 may alternatively be not perpendicular to the first wall 201 and the second wall 202. In this case, the shape of the fourth wall 204 may also be a parallelogram or a trapezium.

Optionally, the first wall 201 is a wall with the largest area in the battery cell 20.

With reference to FIG. 4 and FIG. 6, the first wall 201 and a third wall 203 of the battery cell 20 may be disposed in the box 100 and face toward the bottom wall 122 or the upper cover 121 of the box 100, and the first wall 201 may be the wall with the largest area in the battery cell 20; the second wall 202 of the battery cell 20 may be attached to an adjacent battery cell 20; and the fourth wall 204 and the fifth wall 205 of the battery cell 20 may face toward two side walls 123 of the box 100, respectively. In an embodiment, the first electrode terminal 221 on the fourth wall 204 of the battery cell 20 is conductively connected to a busbar on a second side wall of the box 100, and the second electrode terminal 222 on the fifth wall 205 of the battery cell 20 is conductively connected to a busbar on a third side wall 123 of the box 100.

In the embodiment shown in FIG. 7, the first electrode terminal 221 and the second electrode terminal 222 may be located on a same side of the battery cell 20.

Optionally, the first electrode terminal 221 and the second electrode terminal 222 are disposed on the first wall 201. The first wall 201 has a large area, which facilitates manufacturing and mounting of the first electrode terminal 221 and the second electrode terminal 222 on the battery cell 20. In addition, the first wall 201 may face toward the upper cover 121 or the bottom wall 122 of the box 100, facilitating conductive connection of the electrode terminals via the bottom wall 122 or the upper cover 121.

In a possible embodiment, as shown in FIG. 7, the pressure relief mechanism 213 may further be disposed between the first electrode terminal 221 and the second electrode terminal 222. The pressure relief mechanism 213 and the first electrode terminal 221 or the second electrode terminal 222 are disposed on a same side of the battery cell 20, which can facilitate manufacturing of the battery cell 20 and mounting of the pressure relief mechanism 213. For the description of the pressure relief mechanism 213, reference may be made to the embodiment shown in FIG. 3.

In another possible embodiment, the pressure relief mechanism and the first electrode terminal 221 may alternatively be disposed on two sides of the battery cell 20, respectively. The pressure relief mechanism and the first electrode terminal 221 are disposed on two sides of the battery cell 20, respectively, which helps prevent the pressure relief mechanism from affecting the first electrode terminal 221 and the second electrode terminal 222 when discharging emissions inside the battery cell 20, thereby improving safety performance of the battery cell 20.

Optionally, the battery cell 20 includes an electrode assembly 30, and the electrode assembly 30 is any one of the following: a cylindrical wound structure, a long cylindrical wound structure, and a laminated structure.

Figure 8:
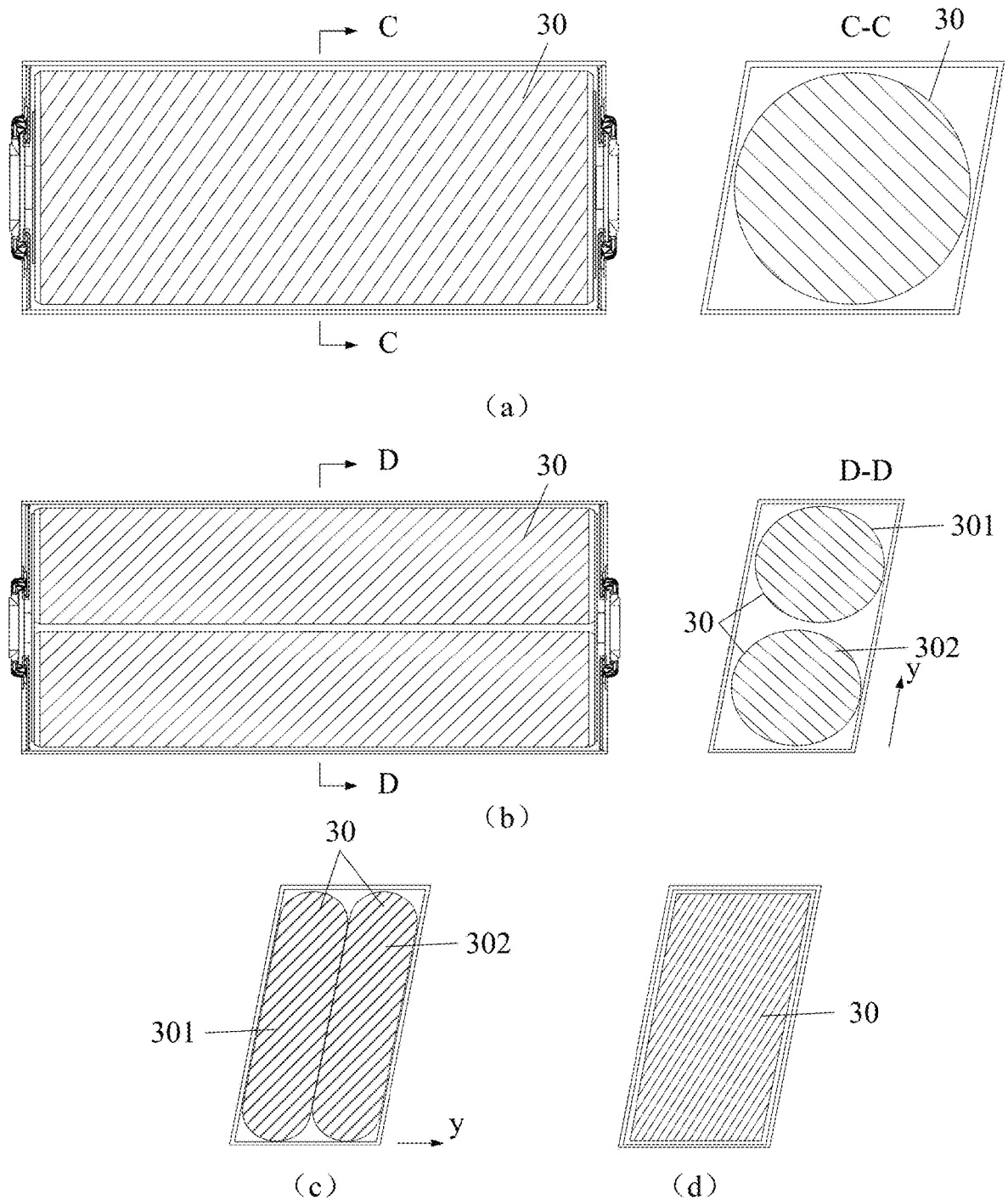
FIG. 8 is a schematic structural diagram of a plurality of battery cells according to an embodiment of this application.

The following describes various types of battery cells 20 provided in the embodiments of this application with reference to FIG. 8 by using an example in which the battery cell 20 is provided with electrode terminals on two sides. For the embodiment in which the electrode terminals are disposed on a same side, reference may be made to the embodiment shown in FIG. 8.

(a) and (b) of FIG. 8 show electrode assemblies 30 of a cylindrical wound structure. As shown in (a) and (b) of FIG. 8, the electrode assembly 30 in the battery cell 20 is a cylindrical structure formed by winding. As shown in (b) of FIG. 8, the battery cell 20 may include two electrode assemblies 30 of the cylindrical wound structure. In an embodiment, a winding axis of the electrode assembly 30 of the cylindrical wound structure may be disposed along the length direction of the battery cell 20.

The electrode assembly 30 of the cylindrical wound structure may easily form self-binding swelling. For example, uneven patterns are set between a positive electrode plate and a negative electrode plate, on a positive electrode plate and/or a negative electrode plate, or between a positive electrode plate and a negative electrode plate, to construct an interlayer space, which is conducive to reducing swelling of the electrode assembly 30 of the cylindrical wound structure, so that a swelling change of an external diameter of the electrode assembly 30 of the cylindrical wound structure is small. Because a swelling force of the electrode assembly 30 of the cylindrical wound structure tends to squeeze toward the middle of the electrode assembly 30, a squeezing force of the electrode assembly 30 of the cylindrical wound structure on a shell of the battery cell 20 can be small, which is more likely to be adapted to application scenarios such as a flat box 100 with no end plate.

(c) of FIG. 8 shows an electrode assembly 30 of a long cylindrical wound structure. As shown in (c) of FIG. 8, the electrode assembly 30 in the battery cell 20 is a long cylindrical structure formed by winding, and the long cylindrical structure may be curved on two sides and straight at the middle. In the embodiment shown in (c) of FIG. 8, the battery cell 20 may include two electrode assemblies 30 of the long cylindrical wound structure, and the two electrode assemblies 30 of the long cylindrical wound structure may be attached to each other via surfaces parallel to the second wall 202. Sometimes, for ease of description, the long cylindrical wound structure may also be referred to as an elliptic wound structure.

(d) of FIG. 8 shows an electrode assembly 30 of a laminated structure. As shown in (d) of FIG. 8, the electrode assembly 30 in the battery cell 20 may be formed by stacking along the third direction x of the battery cell 20. In other embodiments, the electrode assembly 30 in the battery cell 20 may alternatively be formed by stacking along the first direction y or the second direction z of the battery cell 20.

In other embodiments, the battery cell 20 may alternatively include more or fewer electrode assemblies 30, and the various types of electrode assemblies 30 may be disposed in the battery cell 20 in a hybrid manner.

Optionally, the battery cell 20 includes a first electrode assembly 301 and a second electrode assembly 302, where the first electrode assembly 301 and the second electrode assembly 302 are arranged along the first direction y.

In an embodiment, the first electrode assembly 301 and the second electrode assembly 302 may have a substantially same structure, shape, and the like. The first electrode assembly 301 and the second electrode assembly 302 being arranged along the first direction y means that the first electrode assembly 301 and the second electrode assembly 302 have a substantially same distance to the bottom wall 122 or the upper cover 121 of the box 100. The bottom wall 122 or the upper cover 121 of the box 100 is generally parallel to the ground, which helps the first electrode assembly 301 and the second electrode assembly 302 have a same infiltration height in an electrolyte of the battery cell 20. A plurality of electrode assemblies 30 may be arranged along the bottom wall 122 or the upper cover 121 of the box 100 in the battery cell 20, such that the electrolyte in the battery cell 20 can immerse and infiltrate the plurality of electrode assemblies 30 to a substantially same extent, helping improve environmental consistency of the plurality of electrode assemblies 30 in the battery cell 20. In addition, if other thermal management components (for example, a water cooling plate) are further disposed in the box 100, the electrode assemblies 30 can have a substantially same contact area with the other thermal management components, helping improve the environmental consistency of the plurality of electrode assemblies 30 in the battery cell 20.

Optionally, the periphery of the first electrode assembly 301 includes a first region, a second region, and a third region. The first region is in contact with the first wall 201, the second region is in contact with the second wall 202, and the third region is connected between the first wall 201 and the second wall 202 and spaced apart from the first wall 201 and the second wall 202. The first region may be a point, a line, or a surface with a small area. In other words, the electrode assembly 30 may include a region in no contact with the shell of the battery cell 20, and a contact area between the first electrode assembly 301 and the shell of the battery cell 20 may be small. A region on which heat can be transferred between the assembly of the battery 10 and the shell of the battery cell 20 may be small, which is conducive to resolving the problem of heat diffusion of the electrode assembly 30.

With reference to FIG. 4 and FIG. 5, the box 100 may include a plurality of groups of battery cells 20, and the plurality of groups of battery cells 20 may include at least two groups of battery cells 20. Each of the plurality of groups of battery cells 20 may be stacked along a direction parallel to the bottom wall 122 or the upper cover 121 of the box 100. In this application, the direction parallel to the bottom wall 122 or the upper cover 121 of the box 100 may be the first direction y. In an embodiment, the first direction y is perpendicular to the direction of gravity and parallel to a horizontal direction. When the bottom wall 122 or the upper cover 121 of the box 100 is perpendicular to the direction of gravity, the first direction y may be perpendicular to the direction of gravity. The first wall 201 of the battery cell 20 may be parallel to the first direction y, and the second wall 202 is oblique to the first direction y. In other words, the second wall 202 may be neither parallel nor perpendicular to the bottom wall 122 or the upper cover 121.

In each of the plurality of groups of battery cells 20, adjacent battery cells 20 are attached to each other via adjacent second walls 202. As shown in FIG. 4 and FIG. 5, a first group of battery cells may include a first battery cell 20a and a second battery cell 20b that are adjacent to each other along the first direction y, and a second wall 202 of the first battery cell 20a and a second wall 202 of the second battery cell 20b may be parallel to and face toward each other.

In an embodiment, the second wall 202 of the first battery cell 20a and the second wall 202 of the second battery cell 20b may be in direct contact, so that interaction forces can be present between the second wall 202 of the first battery cell 20a and the second wall 202 of the second battery cell 20b. In another embodiment, the second wall 202 of the first battery cell 20a and the second wall 202 of the second battery cell 20b may be attached to each other via other components, so that interaction forces can be present between the second wall 202 of the first battery cell 20a and the second wall 202 of the second battery cell 20b.

Based on the technical solution in this embodiment of this application, in the box 100 of the battery 10, in one group of battery cells 20 arranged along the second direction z, the second walls 202 of the adjacent battery cells 20 attached to each other are oblique to the first direction y, that is, the second walls 202 are oblique to the direction of gravity. Therefore, interaction forces parallel to the direction of gravity are formed between the adjacent second walls 202, so that each battery cell 20 has at least one oblique second wall 202 being pressed by an oblique second wall 202 of an adjacent battery cell 20. The interaction forces formed between the adjacent battery cells 20 make the two adjacent battery cells 20 constrain and restrict each other, which can enhance overall stiffness and strength of the battery 10, reducing safety risks caused by vibration impact during use of the battery 10.

The interaction forces formed between the adjacent battery cells 20 may be equivalent to a resultant force of a first component force perpendicular to the second wall 202 and a second component force parallel to the second wall 202. Under the action of the first component force, the two adjacent battery cells 20 can squeeze each other, so as to help improve stacking compactness of each group of battery cells 20 in the first direction y. Under the action of the second component force, resistance for preventing the two adjacent battery cells 20 from moving relative to each other can be provided, so as to help improve stacking stability of each group of battery cells 20.

In an embodiment, the battery cell 20 may be disposed flat in the box 100. The first wall 201 of the battery cell 20 may be the large surface of the battery cell 20, and the second wall 202 of the battery cell 20 may be the end surface or the small surface of the battery cell 20. As shown in FIG. 4, the first wall 201 of the battery cell 20 may be the large surface of the battery cell 20, and the second wall 202 of the battery cell 20 may be the end surface of the battery cell 20.

The large surface of the battery cell 20 is disposed on the bottom wall 122 of the box 100, so that the battery cell 20 has high stability in the box 100. The second wall 202 having a large area is conducive to increasing the interaction forces between the two adjacent battery cells 20 and providing more structural adhesives on the second wall 202, thereby improving the stability of the battery cell 20. In addition, the embodiment shown in FIG. 4 can be more flexibly applied to a box 100 with no end plate.

In another embodiment, the battery cell 20 may be disposed upright in the box 100. The first wall 201 of the battery cell 20 may be the end surface or the small surface of the battery cell 20, and the second wall 202 of the battery cell 20 may be the large surface of the battery cell 20. As shown in FIG. 5, the first wall 201 of the battery cell 20 may be the end surface of the battery cell 20, and the second wall 202 of the battery cell 20 may be the large surface of the battery cell 20.

The second wall 202 is a wall with the largest area in the battery cell 20, so that the second wall 202 with the largest area can be used for implementing attachment between the adjacent battery cells 20 to the greatest extent, which increases the interaction forces between the adjacent battery cells 20, thereby enhancing the stability and overall stiffness and strength of the battery 10. Further, a structural adhesive may be applied on the second wall 202, so that the adjacent battery cells 20 can be connected to each other via the structural adhesive, further enhancing the stability and overall stiffness and strength of the battery 10. In addition, as compared with a wall in a vertical direction, the oblique second wall 202 has a larger area than the vertical wall. Therefore, the structural adhesive applied on the second wall 202 also has a large area, further enhancing the stability of the battery 10 and the overall stiffness and strength of the battery 10.

The first wall 201 and the second wall 202 may extend along the third direction x of the battery cell 20, and the third direction of the battery cell 20 may be perpendicular to the first direction y and the second direction z. In the embodiments shown in FIG. 4 and FIG. 5, the third direction x may be the length direction of the battery cell 20. In other possible embodiments, the third direction x may alternatively be the width direction or the thickness direction of the battery cell 20.

The plurality of groups of battery cells 20 in the box 100 may be arranged along a direction perpendicular to the bottom wall 122 or the upper cover 121 of the box 100. In an embodiment, the plurality of groups of battery cells 20 in the box 100 may include a first group of battery cells and a second group of battery cells that are adjacent to each other, where the first group of battery cells and the second group of battery cells are arranged along the second direction z, and the second direction z is perpendicular to the first direction y. In this application, the second direction z may be perpendicular to the bottom wall 122 or the upper cover 121 of the box 100. When the bottom wall 122 or the upper cover 121 of the box 100 is perpendicular to the direction of gravity, the second direction z may be parallel to the direction of gravity.

In the embodiments shown in FIG. 4 and FIG. 5, the plurality of groups of battery cells 20 may be arranged along the thickness direction of the battery cell 20. In other possible embodiments, the plurality of groups of battery cells 20 may be arranged along the length direction or the width direction of the battery cell 20.

Optionally, the battery 10 includes N groups of such battery cells 20, and each group of such battery cells 20 includes M battery cells 20, where N and M are positive integers greater than 1 and N is less than M. In other words, a quantity of the battery cells 20 in each group of battery cells 20 may be greater than a total quantity of groups of the at least two groups of battery cells 20. In another possible implementation, a quantity of the battery cells 20 in each group of battery cells 20 may be less than or equal to a total quantity of groups of the at least two groups of battery cells 20.

An overall size of the plurality of groups of battery cells 20 may be adapted to a size of a hollow cavity formed by the box 100. In this embodiment of this application, a specific size and shape of the box 100 may be designed according to the overall size of the plurality of groups of battery cells 20.

In an embodiment, a size of the box 100 along the first direction y may correspond to an overall size of one group of battery cells 20 along the first direction y. A size of the box 100 along the second direction z may correspond to an overall size of the plurality of groups of battery cells 20 along the second direction z.

As an example rather than a limitation, as shown in FIG. 4 to FIG. 7, the first size T of a single battery cell 20 in the first direction y and a first size A of the box 100 in the first direction y satisfy $A=M*T+d_1$, where M is the quantity of the battery cells 20 in each group of battery cells 20, and 0 mm≤$d_1$≤50 mm. Further, 15 mm≤$d_1$≤25 mm. In other words, in the first direction y, the size of the box 100 may be slightly larger than the overall size of one group of battery cells 20, which facilitates the installation of the battery cells 20 in the box 100 and can balance overall volume and energy density of the battery 10.

As an example rather than a limitation, as shown in FIG. 4 to FIG. 7, the second size H of a single battery cell 20 in the second direction z and a second size B of the box 100 in the second direction z satisfy $B=N*H+d_2$, where N is the quantity of groups of the plurality of groups of battery cells 20, and 0 mm≤$d_2$≤50 mm. Further, 15 mm≤$d_2$≤25 mm. In other words, in the second direction z, the size of the box 100 may be slightly larger than the size of the battery cell 20, which facilitates the installation of the battery cells 20 in the box 100 and can balance the overall volume and the energy density of the battery 10.

Similarly, in other directions, a size of the box 100 may also be slightly larger than an overall size of the plurality of groups of battery cells 20.

Because the second wall 202 of the battery cell 20 is oblique to the first direction y, an arrangement direction (that is, the second direction z) of the first group of battery cells and the second group of battery cells may be different from an inclination direction of the second wall 202. As shown in FIG. 4 and FIG. 5, the first group of battery cells may include the third battery cell 20c, the second group of battery cells may include the fourth battery cell 20d, and the third battery cell 20c and the fourth battery cell 20d are adjacent to each other in the second direction z. In other words, the third battery cell 20c and the fourth battery cell 20d are opposite to each other in the second direction z.

The connecting line of the centers of gravity of the third battery cell 20c and the fourth battery cell 20d may be parallel to the second direction z. In an embodiment, the third battery cell 20c and the fourth battery cell 20d may be battery cells 20 having a similar shape, structure, and the like. Because the connecting line of the centers of gravity of the third battery cell 20c and the fourth battery cell 20d may be parallel to the second direction z, a connecting line of corresponding parts of the third battery cell 20c and the fourth battery cell 20d may be parallel to the second direction z.

Figure 9:
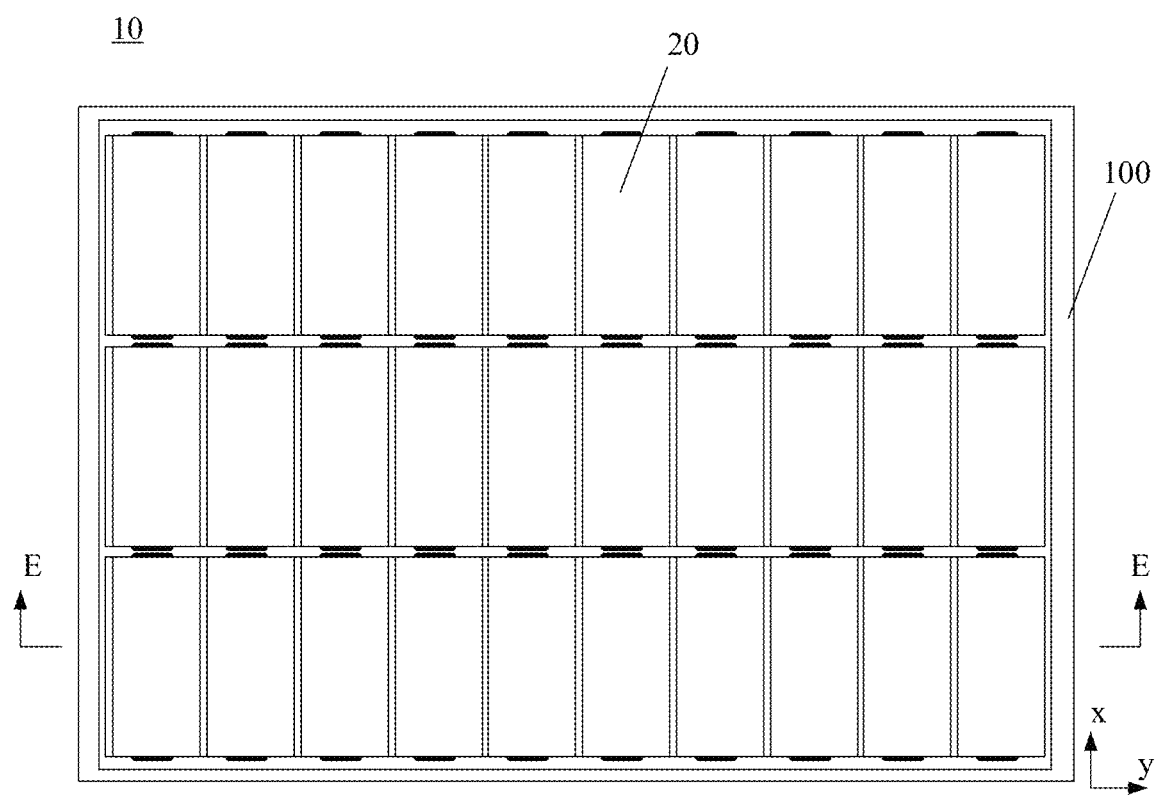
FIG. 9 is a schematic structural diagram of a battery according to an embodiment of this application.
Figure 10:
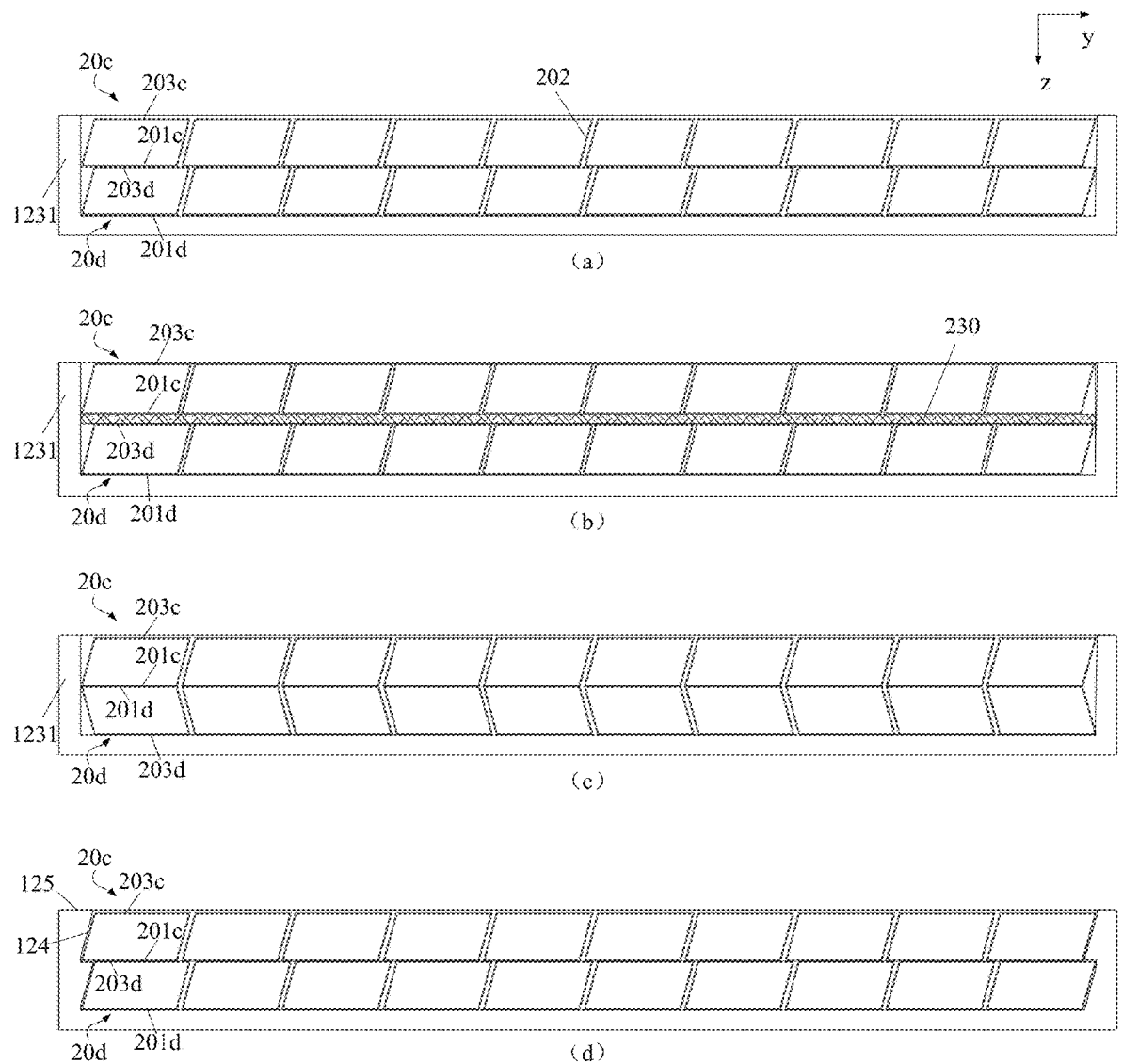
FIG. 10 is an E-E cross-sectional view of the battery shown in FIG. 9.
Figure 11:
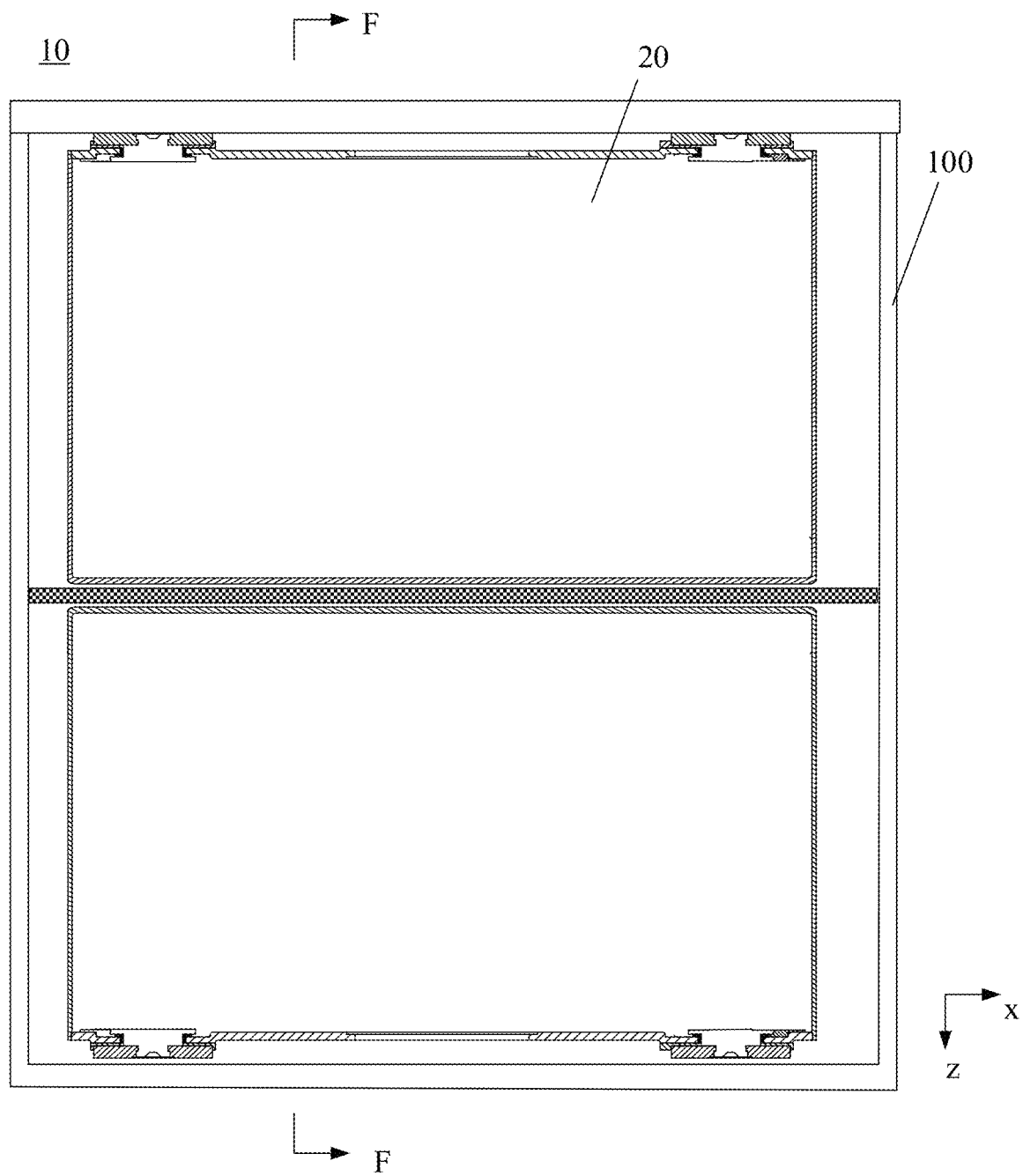
FIG. 11 is a schematic structural diagram of a battery according to an embodiment of this application.

With reference to the embodiment shown in FIG. 4, a structural diagram shown in FIG. 9 can be obtained by observing the battery 10 provided in this embodiment of this application along the second direction z, and a structural diagram shown in FIG. 10 can be obtained by observing an E-E cross section (that is, observing the battery 10 provided in this embodiment of this application along the third direction x perpendicular to the first direction y and the second direction z) shown in FIG. 9. With reference to the embodiment shown in FIG. 5, a structural diagram shown in FIG. 11 can be obtained by observing the battery 10 provided in this embodiment of this application along the second direction z, and a structural diagram shown in FIG. 12 can be obtained by observing an F-F cross section (that is, observing the battery 10 provided in this embodiment of this application along the third direction x perpendicular to the first direction y and the second direction z) shown in FIG. 11.

Optionally, the battery cell 20 further includes a third wall 203, where the third wall 203 is parallel to the first wall 201, a first wall 201c of the third battery cell 20c is aligned with a first wall 201d of the fourth battery cell 20d, and a third wall 203c of the third battery cell 20c is aligned with a third wall 203d of the fourth battery cell 20d.

In an embodiment, as shown in FIG. 10, an orthographic projection of the first wall 201c of the third battery cell 20c on the box 100 overlaps (or completely overlaps) an orthographic projection of the first wall 201d of the fourth battery cell 20d on the box 100, and an orthographic projection of the third wall 203c of the third battery cell 20c on the box 100 overlaps an orthographic projection of the third wall 203d of the fourth battery cell 20d on the box 100. The orthographic projection of the first wall 201c of the third battery cell 20c on the box 100 may cross (or partially overlap) the orthographic projection of the third wall 203d of the fourth battery cell 20d on the box 100, and the orthographic projection of the third wall 203c of the third battery cell 20c on the box 100 may cross the orthographic projection of the first wall 201d of the fourth battery cell 20d on the box 100.

Optionally, the first wall 201c of the third battery cell 20c and the first wall 201d of the fourth battery cell 20d face toward each other, or the first wall 201c of the third battery cell 20c and the third wall 203d of the fourth battery cell 20d face toward each other.

Figure 12:
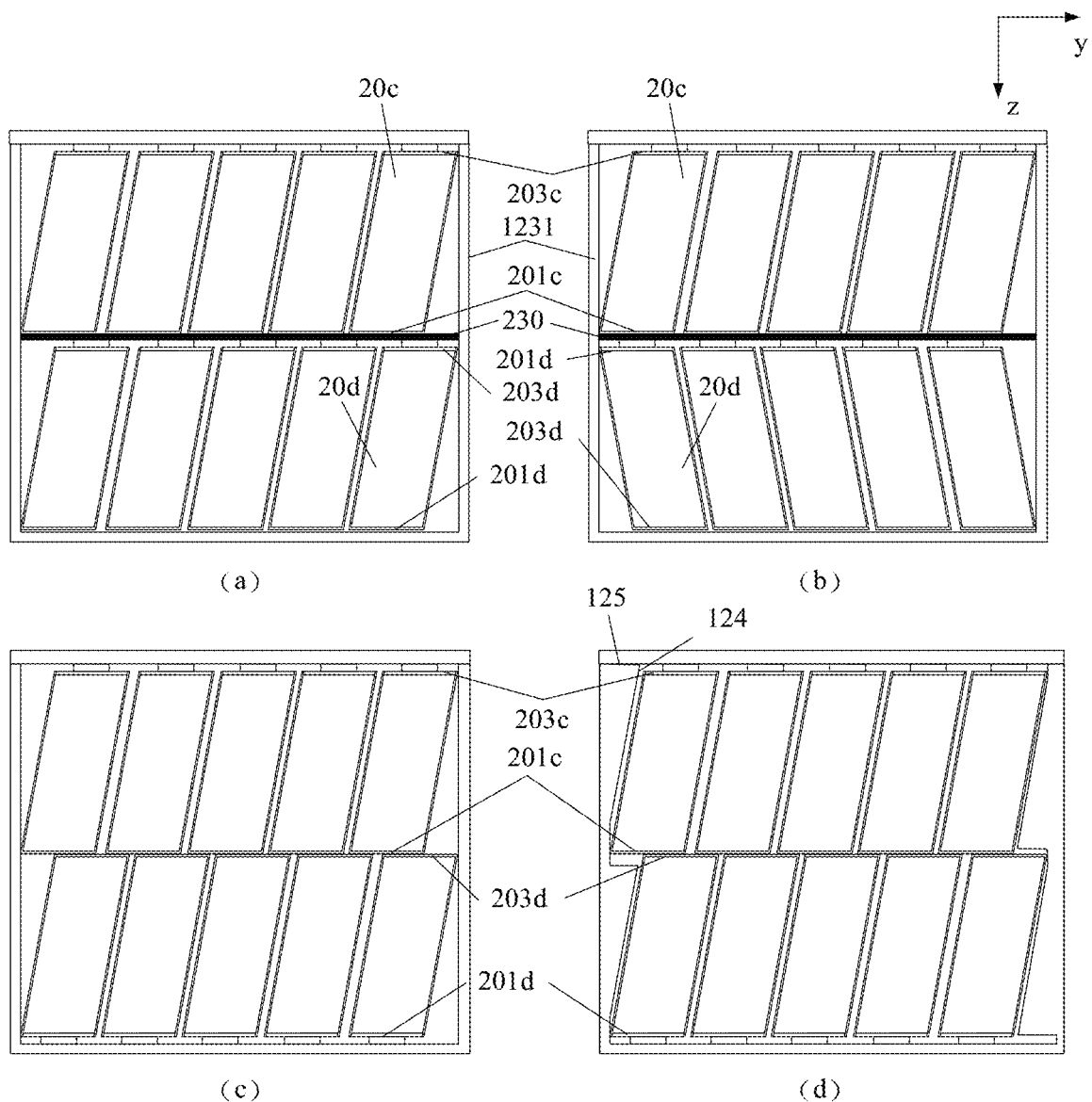
FIG. 12 is an F-F cross-sectional view of the battery shown in FIG. 11.

The first wall 201c of the third battery cell 20c and the first wall 201d of the fourth battery cell 20d facing toward each other may mean that a distance between the first wall 201c of the third battery cell 20c and the first wall 201d of the fourth battery cell 20d is less than a distance between the first wall 201c of the third battery cell 20c and the third wall 203d of the fourth battery cell 20d and less than a distance between the third wall 203c of the third battery cell 20c and the third wall 203d of the fourth battery cell 20d, as shown in (a), (b), and (d) of FIG. 10 and (a), (c), and (d) of FIG. 12.

The first wall 201c of the third battery cell 20c and the third wall 203d of the fourth battery cell 20d facing toward each other may mean that a distance between the first wall 201c of the third battery cell 20c and the third wall 203d of the fourth battery cell 20d is less than a distance between the first wall 201c of the third battery cell 20c and the first wall 201d of the fourth battery cell 20d and less than a distance between the third wall 203c of the third battery cell 20c and the third wall 203d of the fourth battery cell 20d, as shown in (c) of FIG. 10 and (b) of FIG. 12. In an embodiment, the third battery cell 20c and the fourth battery cell 20d may be symmetrical with respect to the first direction y.

In a possible scenario, an inner wall of the box 100 facing toward the second wall 202 of the battery cell 20 may be planar.

Optionally, the center of gravity of the third battery cell 20c has a same distance to a side wall of the box 100 as the center of gravity of the fourth battery cell 20d. In the embodiments shown in (a), (b), and (c) of FIG. 10 and (a), (b), and (c) of FIG. 12, the third battery cell 20c may have a same distance to a first side wall 1231 of the box 100 as the fourth battery cell 20d.

In an embodiment, the first side wall 1231 of the box 100 may extend along the second direction z, and be opposite to the second wall 202 of the battery cell 20 and oblique to the second wall 202 of the battery cell 20. The third battery cell 20c may have a same minimum distance to the first side wall 1231 of the box 100 as the fourth battery cell 20d. The third battery cell 20c may have a same maximum distance to the first side wall 1231 of the box 100 as the fourth battery cell 20d.

Further, the third battery cell 20c may be a battery cell 20 closest to the first side wall 1231 of the box 100 in the first group of battery cells, and the fourth battery cell 20d may be a battery cell 20 closest to the first side wall 1231 of the box 100 in the second group of battery cells. Both the third battery cell 20c and the fourth battery cell 20d may be in contact with the first side wall 1231 of the box 100.

In another possible scenario, an inner wall of the box 100 facing toward the second wall 202 of the battery cell 20 may be three-dimensional.

Optionally, the box 100 has a protrusion on the inner wall, the protrusion includes a first protrusion wall 124, and the first protrusion wall 124 is opposite to the plurality of groups of battery cells 20 and parallel to the second wall 202 of the battery cell 20. In other words, with reference to FIG. 4 and FIG. 5, the first protrusion wall 124 may be oblique to the upper cover 121 or the bottom wall 122 of the box 100. In the embodiments shown in (d) of FIG. 10 and (d) of FIG. 12, the protrusion may extend out of the side wall of the box 100 toward the second wall 202 of the battery cell 20, which is conducive to reducing space between the box 100 and the battery cell 20, thereby reducing shake of the battery cell 20 in the box 100.

Further, the first protrusion wall 124 is attached to the second wall 202 of one battery cell 20 in the plurality of groups of battery cells 20. For example, the first protrusion wall 124 may face toward the second wall 202 of the battery cell 20. In an embodiment, the first protrusion wall 124 and the second wall 202 of the battery cell 20 may be in direct contact, so that interaction forces can be present between the first protrusion wall 124 and the second wall 202 of the battery cell 20. In another embodiment, the first protrusion wall 124 and the second wall 202 of the battery cell 20 may be attached to each other via another component, so that interaction forces can be present between the first protrusion wall 124 and the second wall 202 of the battery cell 20. In this way, the box 100 can provide an abutting force to the second wall 202 of the battery cell 20 through the first protrusion wall 124, which is conducive to limiting the battery cell 20 in the box 100.

Further, as shown in (d) of FIG. 10 and (d) of FIG. 12, the protrusion further includes a second protrusion wall 125, and the second protrusion wall 125 is flush with the first wall 201 of the battery cell 20. In other words, the second protrusion wall 125 may be parallel to the upper cover 121 or the bottom wall 122 of the box 100. The second protrusion wall 125 being flush with the first wall 201 of the battery cell 20 is conducive to calibrating installation accuracy of the battery cell 20 in a height direction of the box 100.

In addition, to ensure installation stability of the plurality of battery cells 20 in the box 100, optionally, the battery 10 may further include an end plate disposed on at least one end of at least one group of battery cells 20 in the first direction y. In some implementations, the end plate may be the side wall 123 of the box 100 in the first direction y. To be adapted to the second wall 202 of the battery cell 20, the end plate may have a wall oblique to the first direction y, and the oblique wall is configured to be attached to the second wall 202 of the battery cell 20.

Specifically, both ends of one group of battery cells 20 may be provided with the end plates, so as to fasten and restrict the group of battery cells 20 in the first direction y. In an embodiment, the end plate is further configured to support the second walls 202 located on two sides of the group of battery cells 20 and having a large area, so as to bear stress on the second walls 202 caused by swelling of the battery cells 20. Optionally, the end plate may extend along the third direction x of the battery cell 20 to be fully attached to the battery cell 20 and support the battery cell 20.

The end plate may be a right-angled trapezium on a cross section perpendicular to the first direction y and the second direction z, one end surface of the end plate is configured to be adapted to the oblique second wall 202 of the battery cell 20, and other end surfaces are all parallel to or perpendicular to a horizontal plane. In this way, the end plate can be well adapted for being installed in a regular shape, for example, in a hollow box 100 of a cuboid structure, thereby improving installation stability of the end plate and the battery cell 20 attached to the end plate in the box 100. In addition, a partial region of the end plate of the structure is thick in the first direction y, and therefore has high stiffness and strength in the first direction y, enhancing the overall stiffness, strength, and stability of the battery 10.

Optionally, the end plate may be thicker on an end facing toward the direction of gravity than on an end facing away from the direction of gravity, thereby ensuring that the battery 10 has higher stiffness, strength, and stability on an end facing the direction of gravity. When the battery 10 is installed on a chassis of a vehicle, the battery 10 can better resist external impacts caused by flying stones from the bottom of the vehicle and the like, improving installation stability of the battery 10 in the vehicle and ensuring operation performance of the battery 10.

The end plate may alternatively be a conventional rectangular plate structure or another structure, and a gap between the end plate and the battery cell 20 may be filled with a structural adhesive or another related component.

High-pressure gas and heat are generated inside the battery cell 20 in continuous operation of the battery cell 20. The high-pressure gas can make the battery cell 20 swell, which generates large stress on the second wall 202 of the battery cell 20. Heat inside the battery 10 can be transferred to the outside through the second wall 202 of the battery cell 20.

Therefore, in this embodiment of this application, the second walls 202 of the two adjacent battery cells 20 are attached to each other, and swelling of the battery cells 20 may make the stress continuously accumulate on the second walls 202, which affects strength and stiffness of the battery 10 in the first direction y, thereby affecting the overall stability and safety of the battery 10. In addition, when any one of the battery cells 20 experiences thermal runaway, heat generated inside the battery cell 20 is transferred to another battery cell 20 through the second wall 202, which affects performance of the another battery cell 20 and may cause thermal runaway of the another battery cell 20, resulting in serious safety problems.

Therefore, as shown in (b) of FIG. 10 and (a) and (b) of FIG. 12, a spacer 230 may be disposed between two adjacent groups of battery cells 20.

Optionally, the spacer 230 is disposed between the third battery cell 20c and the fourth battery cell 20d, and the spacer 230 is at least one of the following: a cross beam, a thermal management component, and a structural adhesive.

The spacer 230 may extend along the first direction y, and a length of the spacer 230 in the first direction y may be greater than or equal to an overall length of one group of battery cells 20, such that the spacer 230 can be fully spaced apart between the two adjacent groups of battery cells 20. In an example, two ends of the spacer 230 in the first direction y may separately abut against the box 100 to enhance stability of the spacer 230 in the box 100, thereby enhancing stability of the battery cells 20 attached to the spacer 230 in the box 100.

As shown in (a) and (b) of FIG. 12, the first wall 201c of the third battery cell 20c and the spacer 230 may abut against each other, and the third wall 203c on the other side may be provided with two electrode terminals of the battery cell 20. In this way, the spacer 230 can fully support the two groups of battery cells 20 without affecting the provision of related components such as the electrode terminals and the busbar in the two groups of battery cells 20.

In an example, if the spacer 230 is a cross beam, the spacer 230 can have specified stiffness and strength, and the spacer 230 being disposed between the two adjacent groups of battery cells 20 can enhance the overall stiffness and strength of the battery 10, thereby improving overall impact resistance of the battery 10. In addition, the spacer 230 can also block heat transfer. When a battery cell 20 located on one side of the spacer 230 experiences thermal runaway, a large amount of heat generated inside this battery cell 20 is blocked by the spacer 230 to some extent, which prevents the heat from being transferred to a battery cell 20 located on the other side of the spacer 230, and ensures normal operation of the battery cell 20 located on the other side of the spacer 230, thereby improving the overall safety of the battery 10.

In addition to the cross beam, the spacer 230 may alternatively be a thermal management component, for example, a cooling component such as a cooling plate. This thermal management component has not only specified stiffness and strength but also a thermal management function for the battery cell 20, and thus can regulate temperature of the battery cell 20, further ensuring working performance and safety performance of the battery 10.

In some embodiments, the thermal management component may be disposed corresponding to walls other than the second wall 202 of the at least one group of battery cells 20 for thermal management of the at least one group of battery cells 20.

Specifically, the thermal management component is configured to accommodate fluid to regulate temperature of the battery cell 20. The fluid herein may be liquid or gas. Regulating temperature means heating or cooling the battery cell 20. In the case of cooling or lowering the temperature of the battery cell 20, the thermal management component is configured to accommodate cooling fluid to lower the temperature of the battery cell 20. In this case, the thermal management component may also be referred to as a cooling component, a cooling system, a cooling plate, or the like, and the fluid accommodated therein may also be referred to as a cooling medium or cooling fluid, and more specifically, cooling liquid or cooling gas. In addition, the thermal management component may further be configured to heat and increase the temperature of the battery cell 20. This is not limited in the embodiments of this application. Optionally, the fluid may be circulated to achieve a better temperature regulation effect. Optionally, the fluid may be water, a mixture of water and ethylene glycol, air, or the like.

Optionally, the thermal management component may be disposed corresponding to one or more of the first wall 201, the third wall 203, the fourth wall 204, and the fifth wall 205 of the at least one group of battery cells 20 for thermal management of each battery cell 20 in the at least one group of battery cells 20. The first wall 201 has a large area, so the thermal management component may be disposed corresponding to the first wall 201 of the at least one group of battery cells 20 to enhance a temperature management effect of the thermal management component on the battery cell 20.

As an example rather than a limitation, the thermal management component may be disposed on a side of the at least one group of battery cells 20 facing toward the inside of the electric apparatus in which the at least one group of battery cells 20 are located, and the pressure relief mechanism of the at least one group of battery cells 20 is disposed on a side of the at least one group of battery cells 20 facing away from the inside of the electric apparatus in which the at least one group of battery cells 20 are located.

The thermal management component may be located on a side of the at least one group of battery cells 20 facing away from the direction of gravity, for example, the thermal management component may be disposed corresponding to the first wall 201 of the at least one group of battery cells 20. Optionally, in some application scenarios, the side of the at least one group of battery cells 20 facing away from the direction of gravity is the side facing toward the inside of the electric apparatus in which the at least one group of battery cells 20 are located. For example, the battery 10 may be located on the chassis of the vehicle, and the side of the at least one group of battery cells 20 facing away from the direction of gravity is a side facing toward the inside of the vehicle. The thermal management component is disposed on the side of the at least one group of battery cells 20 facing toward the inside of the electric apparatus in which the at least one group of battery cells 20 are located, which can isolate the at least one group of battery cells 20 from the inside of the electric apparatus, and prevent influence on the inside of the electric apparatus caused by thermal runaway of the battery cell 20, thereby improving overall safety performance of the electric apparatus.

On this basis, optionally, the pressure relief mechanism of the at least one group of battery cells 20 may be disposed opposite the thermal management component, for example, the pressure relief mechanism may be located on the third wall 203 on a side of the at least one group of battery cells 20 facing toward the direction of gravity. In this case, in some application scenarios, the pressure relief mechanism of the at least one group of battery cells 20 is disposed on the side of the at least one group of battery cells 20 facing away from the inside of the electric apparatus in which the at least one group of battery cells 20 are located.

Through such implementation, the pressure relief mechanism of the at least one group of battery cells 20 is disposed away from the inside of the electric apparatus, which can reduce influence on the inside of the electric apparatus caused by high-temperature emissions discharged by the battery cell 20 through the pressure relief mechanism when the battery cell 20 experiences thermal runaway, further improving the safety performance of the electric apparatus.

In some other implementations, the pressure relief mechanism of the at least one group of battery cells 20 may alternatively be disposed on the first wall 201 corresponding to the thermal management component. In this case, when the battery cell 20 experiences thermal runaway, high-temperature emissions discharged through the pressure relief mechanism impact on the thermal management component, and the fluid in the thermal management component flows out to lower temperature of the battery cell 20 experiencing thermal runaway, thereby preventing influence of the battery cell 20 on other components in the battery 10, and also ensuring the safety performance of the electric apparatus to some extent.

In still some other implementations, the pressure relief mechanism of the at least one group of battery cells 20 may alternatively be disposed on the fourth wall 204 (or the fifth wall 205), and the fourth wall 204 does not face toward the inside of the electric apparatus. When the pressure relief mechanism 213 is located on the fourth wall 204, high-temperature emissions discharged through the pressure relief mechanism 213 have small influence on the inside of the electric apparatus, also ensuring the safety performance of the electric apparatus to some extent.

In other alternative implementations, the spacer 230 may alternatively be a structural adhesive with a specified thickness or another type of component which can be spaced apart between the two adjacent groups of battery cells 20. A specific structure of the spacer 230 may be not limited in the embodiments of this application.

In the embodiments shown in FIG. 10 and FIG. 12, only the battery 10 including one spacer 230 is used as an example for description. Optionally, the battery 10 may include a plurality of spacers 230, and the plurality of spacers 230 may be disposed on different positions in one group of battery cells 20, respectively.

As an example rather than a limitation, a quantity of the spacers 230 may be less than or equal to 5. Further, the quantity of the spacers 230 may be within the foregoing range to balance the overall strength and energy density of the battery 10.

An embodiment of this application further provides an electric apparatus, where the electric apparatus may include the battery 10 in the foregoing embodiments, and the battery 10 is configured to supply electric energy to the electric apparatus.

Optionally, the electric apparatus may be a vehicle, a ship, or a spacecraft.

The foregoing describes the battery 10 and the electric apparatus in the embodiments of this application; and the following describes a method and apparatus for manufacturing the battery 10 in the embodiments of this application. For those not described in detail, reference may be made to the foregoing embodiments.

Figure 13:
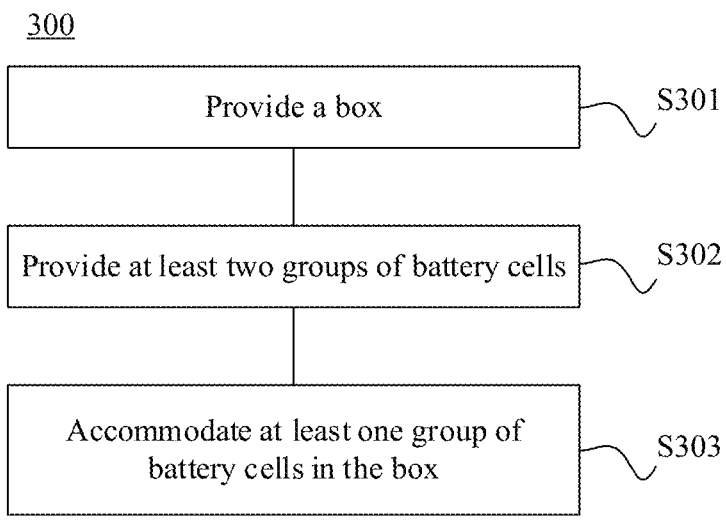
FIG. 13 is a schematic flowchart of a method for manufacturing battery according to an embodiment of this application.

FIG. 13 is a schematic flowchart of a method 300 for manufacturing the battery 10 according to an embodiment of this application. As shown in FIG. 13, the method 300 may include the following steps.

S301. Provide a box 100.

S302. Provide at least two groups of battery cells 20, where the at least two groups of battery cells 20 are accommodated in the box 100, each of the at least two groups of battery cells 20 includes a plurality of battery cells 20 arranged along a first direction y, the first direction y being parallel to an upper cover 121 or a bottom wall 122 of the box 100, and the at least two groups of battery cells 20 are stacked along a second direction z, the second direction z being perpendicular to the first direction y; and the battery cell 20 is a polyhedral structure and includes a first wall 201 and a second wall 202 that are connected to each other, where the first wall 201 is parallel to the first direction y, the second wall 202 is oblique to the first wall 201, and a cross section of the battery cell 20 on a plane perpendicular to the first wall 201 and the second wall 202 is a parallelogram; where second walls 202 of a first battery cell 20a and a second battery cell 20b that are adjacent to each other along the first direction y are attached to each other; and a connecting line of the centers of gravity of a third battery cell 20c and a fourth battery cell 20d that are adjacent to each other along the second direction z is parallel to the second direction z.

S303. Accommodate the at least two groups of battery cells 20 in the box 100.

Figure 14:
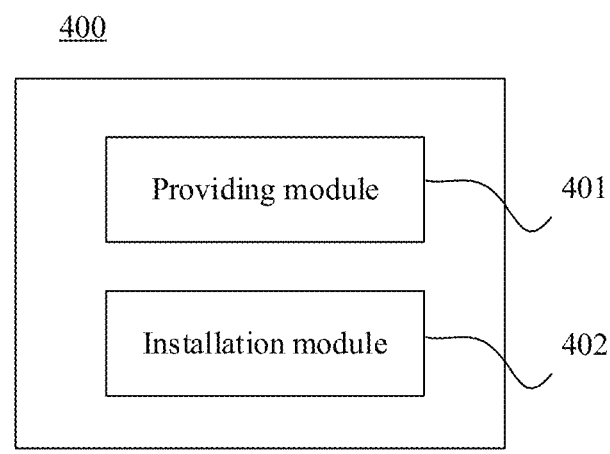
FIG. 14 is a schematic block diagram of an apparatus for manufacturing battery according to an embodiment of this application.

FIG. 14 is a schematic block diagram of an apparatus 400 for manufacturing the battery 10 according to an embodiment of this application. As shown in FIG. 14, the apparatus 400 for manufacturing the battery 10 may include a providing module 401 and an installation module 402.

The providing module 401 is configured to: provide a box 100; and provide at least two groups of battery cells 20, where the at least two groups of battery cells 20 are accommodated in the box 100, each of the at least two groups of battery cells 20 includes a plurality of battery cells 20 arranged along a first direction y, the first direction y being parallel to an upper cover 121 or a bottom wall 122 of the box 100, and the at least two groups of battery cells 20 are stacked along a second direction z, the second direction z being perpendicular to the first direction y; and the battery cell 20 is a polyhedral structure and includes a first wall 201 and a second wall 202 that are connected to each other, where the first wall 201 is parallel to the first direction y, the second wall 202 is oblique to the first wall 201, and a cross section of the battery cell 20 on a plane perpendicular to the first wall 201 and the second wall 202 is a parallelogram; where second walls 202 of a first battery cell 20a and a second battery cell 20b that are adjacent to each other along the first direction y are attached to each other; and a connecting line of the centers of gravity of a third battery cell 20c and a fourth battery cell 20d that are adjacent to each other along the second direction z is parallel to the second direction z.

The installation module 402 is configured to accommodate the at least two groups of battery cells 20 in the box 100.

Although this application has been described with reference to the preferred embodiments, various modifications to this application and replacements with equivalents of the components herein can be made without departing from the scope of this application. In particular, as long as there is no structural conflict, the various technical features mentioned in the embodiments can be combined in any manners. This application is not limited to the specific embodiments disclosed in this specification, but includes all technical solutions falling within the scope of the claims.

The invention claimed is:

1. A battery, characterized by comprising:
a box; and
at least two groups of battery cells accommodated in the box, wherein each of the at least two groups of battery cells comprises a plurality of battery cells arranged along a first direction, the first direction being parallel to an upper cover or a bottom wall of the box, and the at least two groups of battery cells are stacked along a second direction, the second direction being perpendicular to the first direction; and the battery cell is a polyhedral structure and comprises a first wall and a second wall that are connected to each other, wherein the first wall is parallel to the first direction, the second wall is oblique to the first wall, and a cross section of the battery cell on a plane perpendicular to the first wall and the second wall is a parallelogram;
wherein second walls of a first battery cell and a second battery cell that are adjacent to each other along the first direction are directly attached to each other via an adhesive; and a connecting line of the centers of gravity of a third battery cell and a fourth battery cell that are adjacent to each other along the second direction is parallel to the second direction.

2. The battery according to claim 1, characterized in that the center of gravity of the third battery cell has a same distance to a side wall of the box as the center of gravity of the fourth battery cell.

3. The battery according to claim 1, characterized in that the battery cell further comprises a third wall, wherein the third wall is parallel to the first wall, a first wall of the third battery cell is aligned with a first wall of the fourth battery cell, and a third wall of the third battery cell is aligned with a third wall of the fourth battery cell.

4. The battery according to claim 3, characterized in that the first wall of the third battery cell and the first wall of the fourth battery cell face toward each other, or the first wall of the third battery cell and the third wall of the fourth battery cell face toward each other.

5. The battery according to claim 1, characterized in that the battery cell further comprises a first electrode terminal and a second electrode terminal, wherein the first electrode terminal and the second electrode terminal are located on two sides of the battery cell, respectively.

6. The battery according to claim 5, characterized in that the battery cell further comprises a fourth wall and a fifth wall that are opposite to each other, wherein the fourth wall is connected to the first wall and the second wall, the fifth wall is connected to the first wall and the second wall, the fourth wall is provided with the first electrode terminal, the fifth wall is provided with the second electrode terminal, and the fourth wall is perpendicular to the first wall and the second wall.

7. The battery according to claim 1, characterized in that the first wall is a wall with the largest area in the battery cell.

8. The battery according to claim 1, characterized in that the battery cell further comprises a first electrode terminal and a second electrode terminal, wherein the first electrode terminal and the second electrode terminal are located on a same side of the battery cell.

9. The battery according to claim 8, characterized in that the first electrode terminal and the second electrode terminal are disposed on the first wall.

10. The battery according to claim 1, characterized in that the battery cell comprises a first electrode assembly and a second electrode assembly, wherein the first electrode assembly and the second electrode assembly are arranged along the first direction.

11. The battery according to claim 1, characterized in that the first wall is connected to the second wall via a rounded corner.

12. The battery according to claim 1, characterized in that a spacer is disposed between the third battery cell and the fourth battery cell, and the spacer is at least one of the following: a cross beam, a thermal management component, and a structural adhesive.

13. The battery according to claim 1, characterized in that the battery cell comprises an electrode assembly, and the electrode assembly is any one of the following: a cylindrical wound structure, a long cylindrical wound structure, and a laminated structure.

14. The battery according to claim 1, characterized in that the battery comprises N groups of such battery cells, and each group of such battery cells comprises M battery cells, wherein N and M are positive integers greater than 1 and N is less than M.

15. The battery according to claim 1, characterized in that an inclination angle $\theta$ of the second wall to the second direction satisfies $0° < \theta \le 60°$.

16. The battery according to claim 1, characterized in that a first size T of the battery cell in the first direction satisfies $6 \text{ mm} \le T \le 150 \text{ mm}$.

17. The battery according to claim 1, characterized in that a second size H of the battery cell in the second direction satisfies $H=(T-c)*\cot\theta$, wherein $-50 \text{ mm} \le c \le 50 \text{ mm}$, T is the first size of the battery cell in the first direction, and $\theta$ is the inclination angle of the second wall to the second direction.

18. The battery according to claim 1, characterized in that a third size W of the battery cell satisfies $100 \text{ mm} \le W \le 1200 \text{ mm}$.

19. An electric apparatus, characterized by comprising the battery according to claim 1.

* * * * *